United States Patent
Naum

[11] Patent Number: 5,579,429
[45] Date of Patent: Nov. 26, 1996

[54] LASER DYE DOPED FLUORESCENT OPTICAL FIBER AND METHOD OF PREPARATION OF THE SAME

[75] Inventor: Daniel Naum, Eugene, Oreg.

[73] Assignee: DN Labs, Inc., Eugene, Oreg.

[21] Appl. No.: 524,066

[22] Filed: Sep. 6, 1995

[51] Int. Cl.$^6$ .................................................. G02B 6/16
[52] U.S. Cl. ................ 385/143; 252/301.17; 252/301.35; 385/123; 385/127; 385/901
[58] Field of Search ..................................... 385/123–127, 385/141, 143, 145, 901; 252/301.16, 301.17, 301.35

[56] References Cited

U.S. PATENT DOCUMENTS

| | | | |
|---|---|---|---|
| 3,433,570 | 3/1969 | Hansen | 356/128 |
| 3,472,921 | 10/1969 | Fyfe | 264/1.29 |
| 3,779,627 | 12/1973 | Pinnow et al. | 385/141 |
| 3,791,714 | 2/1974 | Maurer | 385/142 |
| 3,813,141 | 5/1974 | Miller | 385/125 |
| 3,930,103 | 12/1975 | Chimura et al. | 428/361 |
| 3,960,824 | 6/1976 | Hicks | 526/85 |
| 3,993,834 | 11/1976 | Chimura et al. | 428/373 |
| 4,026,851 | 5/1977 | Greene | 528/363 |
| 4,095,101 | 6/1978 | Lemelson | 250/227.11 |
| 4,138,194 | 2/1979 | Beasley et al. | 385/143 |
| 4,195,907 | 4/1980 | Zamja et al. | 385/125 |
| 4,246,382 | 1/1981 | Honda et al. | 526/79 |
| 4,354,736 | 10/1982 | Maklad et al. | 385/125 |
| 4,422,719 | 12/1983 | Orcutt | 385/123 |
| 4,505,543 | 3/1985 | Ueba et al. | 385/143 |
| 4,804,246 | 2/1989 | Kobayashi et al. | 385/145 |
| 4,844,578 | 7/1989 | Pierfini et al. | 385/128 |
| 4,919,513 | 4/1990 | Nakakuki et al. | 385/127 |
| 4,957,347 | 9/1990 | Zarian | 385/125 |
| 5,122,580 | 6/1992 | Zarian et al. | 526/64 |
| 5,446,157 | 8/1995 | Morgan et al. | 546/13 |

OTHER PUBLICATIONS

Dan Thompson and Carlos Bedoya, Optical Fiber Finally Takes Off, Apr. 1995, *Photonics Spectra* p. 82.
Joseph R. Knisley, Contributing Editor, NYC Office Tower Clock Faces Get A Lift From New Lighting Technology, Jun. 1994, *CEE News* (cover story).
U. Strecker, A. Hoffman, W. Daum, and J. Munschau, Plastic Optical Fiber Braves The Elements, Apr. 1995, *Photonics in Aerospace & Transportation*, p. 93.
Martha H. Tulloch, Associate Editor, Fiber Optic Message Signs Instruct Dutch Motorists, Apr. 1995, *Photonics Spectra*, p. 18.

Primary Examiner—John D. Lee

[57] ABSTRACT

A fluorescent optical fiber is provided that is prepared from a novel material. The novel material comprises a cross-linked polymer Poly(methyl methacrylate) (MMA) [$CH_2$=C($CH_3$)COO$CH_3$] and allyl diglycol carbonate (CR-39), initiated with 2.2'-Azo-bis (2 Methylpropionitrile) [($CH_3$)$_2$C(CN)N=NC($CH_3$)$_2$CN], in which a laser dye or mixture of dyes is dissolved, and the mixture is then thermoset under pressure into Teflon® tubing. The material exhibits fluorescence when illuminated by various light sources. When the material is formed into a fiber, the result is a fluorescent, large diameter, flexible, light transmitting optical fiber, that emits a lot of side light, presenting a neon-like effect, and can thus be used in illumination applications. Also disclosed is a method of preparation of this novel material into a fiber.

25 Claims, 20 Drawing Sheets

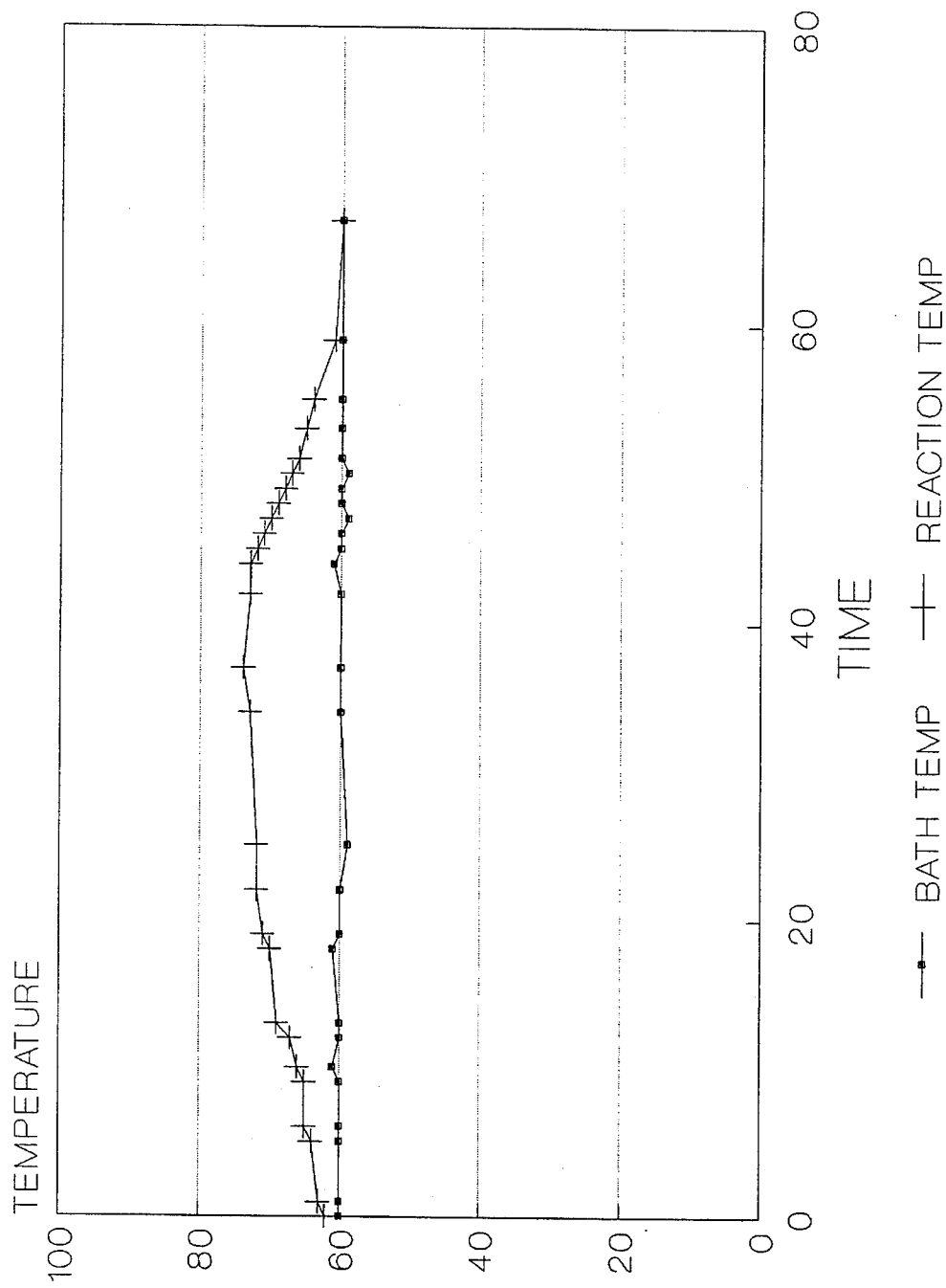

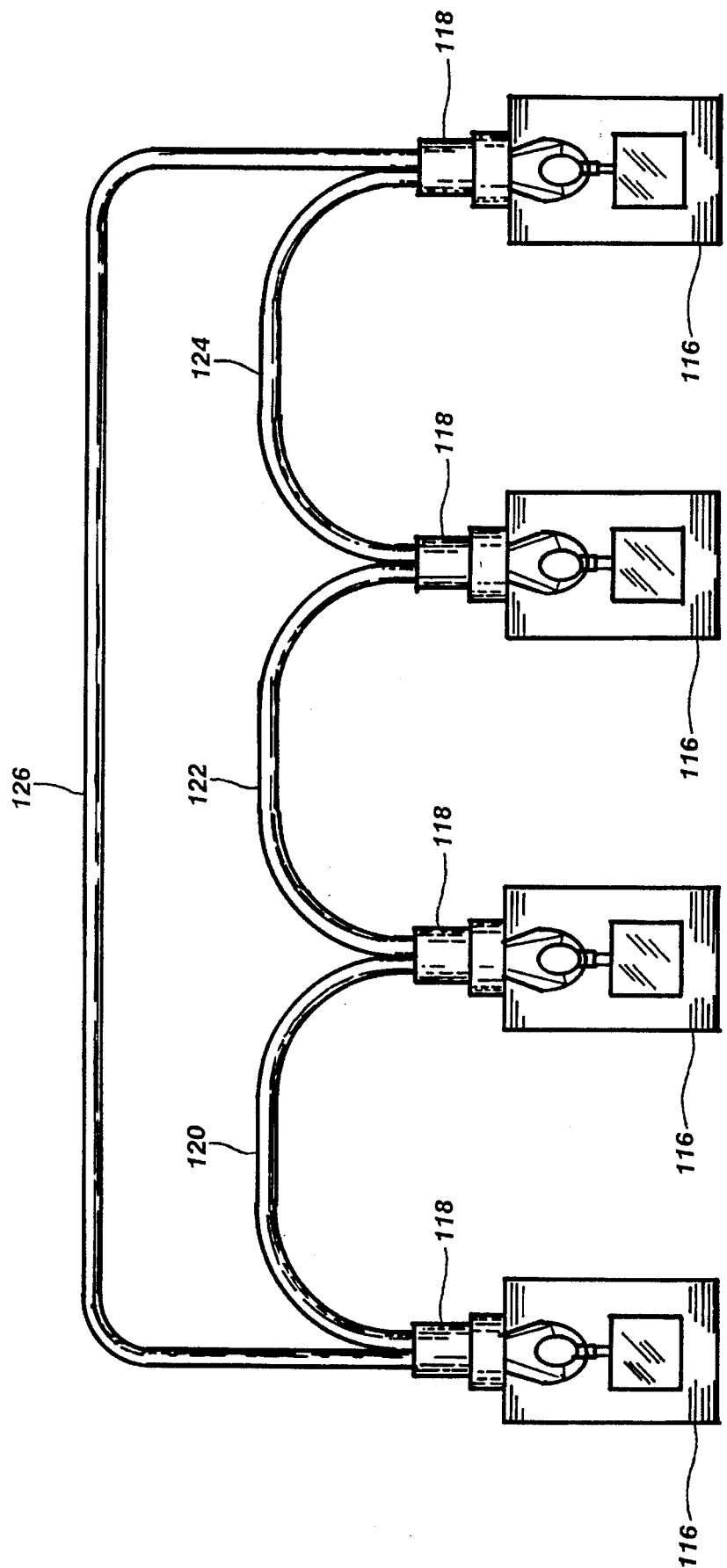

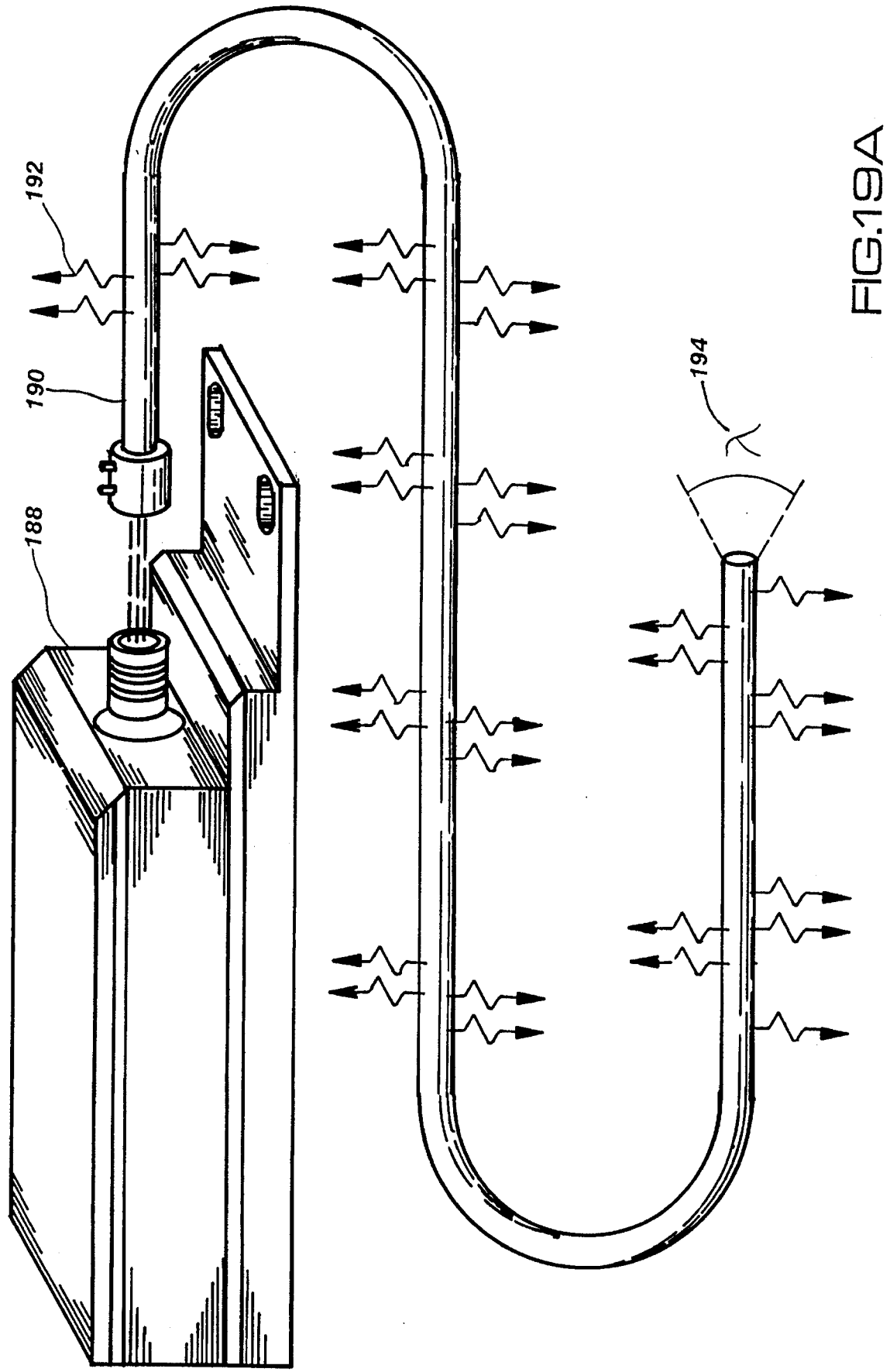

LASER DYE DOPED FLUORESCENT OPTICAL FIBER AND METHOD OF PREPARATION OF THE SAME

BACKGROUND OF THE INVENTION

1. Field of the Invention

The present invention is related to the field of flexible plastic light conduits that are doped with laser dyes, and illumination applications of the same. The present invention is specifically related to the field of fluorescent plastic optical fibers formed by a monomer such as methyl methacrylate (MMA) $[CH_2=C(CH_3)COOCH_3]$ that is cross-linked by a co-monomer such as allyl diglycol carbonate (CR-39), the mixture of which is further doped with high quantum efficiency fluorescent dyes, such as those used in dye lasers.

2. Description of the Prior Art

Glass fibers are used typically to transmit light in communication applications, where the fine optical properties of glass are exploited to achieve the lowest possible attenuation of transmitted light signals. Glass fibers, however, have been generally unsuccessful when used for transmitting light for purposes of illumination (except for short distance applications), because of disadvantages such as brittleness, expense, small diameter, and a general inability to pass high levels of illumination (a result caused by their small diameters). Indeed, to increase the light transmission capabilities of commercially available small diameter glass fibers, many of them are bundled together into a single light conduit; however, such bundles are expensive to manufacture, heavy, and the typical maximum diameter of such bundles is limited to approximately ¾". In addition, the adhesive used in the manufacturing process of the bundles tends to degrade at temperatures generated by light sources that are typically present, such as tungsten halogen or arc lamps.

In fibers used for side illumination applications, it is desired for the light to escape from the core of the fiber through the cladding without a drop-off of illumination intensity along the length of the fiber. Additionally, there should be preferably a large amount of side light for better visibility. Fibers used for illumination should be of large diameter, so that they can be visible from a distance, such as when used for road signs. Such fibers should have good resistance to environmental factors such as heat, cold, sunlight, moisture, etc.

The very characteristic of high optical quality that makes glass fibers desirable for applications in the transmission of light is also the reason that glass fibers are not well suited for illumination applications. If light propagates and emerges as end light, without "loss" through the cladding, then effective side illumination is not achieved.

In side illumination applications, plastic optical fiber light conduits exhibit some marked advantages over their glass counterparts—light weight, low cost, flexibility (lack of brittleness), and large diameters (up to 1" are possible). Plastic optical fibers do not exhibit as good an optical quality as glass; however, a high optical grade quality is not required for such applications and, indeed, plastic optical fibers are finding a wide variety of side illumination applications, from road signs, advertising signs, billboards, and store displays, to illumination in explosive environments.

One current application for flexible optical fibers is to approximate the appearance of neon color tubes. Heretofore the method for approximating this neon "look" has been by illuminating currently available clear fiber with a tungsten halogen or metal halide lamp, and sometimes also utilizing a changing color wheel to provide variations in the color of the pumping light. Such illuminating is described in U.S. Pat. No. 4,704,660 to Robbins, U.S. Pat. No. 5,111,367 to Churchill, U.S. Pat. No. 5,222,793 to Davenport et al., and U.S. Pat. No. 5,321,586 to Hege et al. Such illuminating uses a light source (e.g. a tungsten halogen or metal halide arc lamp) for optical pumping in conjunction with a collection device (usually an elliptic reflector). The reflector focuses the light onto a narrow entry point at the input end of the fiber. A color filter wheel may be positioned between the reflector and this fiber entry point to interpose variously colored filters successively between the fiber and the beam. Where used to color the fiber, such color wheels are usually powered to provide a changing succession of colors using a color wheel (rotation rate of 0.5 to 5 RPM).

To use plastic optical fibers for neon-like illumination, it is desired that (a) a high percentage of the input light "escapes" from the fiber as side light, and that (b) the fiber can accommodate a large amount of input light. Typical clear optical conduits, when used for side lighting applications, transmit about 60% to 90% of the light out of the output end of the fiber. This means that only a small portion (i.e. 10%–40%) of the light energy is transmitted through the walls of the fiber, causing the neon-like effect to appear faint and washed out, without the vibrant "glow" of a true neon gas discharge tube.

To achieve a more neon-like intensity and appearance with these prior art fibers, higher power levels of input light have been attempted. Higher light power levels, however, are typically accompanied by higher power requirements, and resulting higher heat levels and higher operating temperatures, both for the illuminator and for the fiber (at the point where the input light is focused on the input end of the fiber). Such temperatures might reach as high as 150° C. to 250° C. Plastic optical fibers will not survive such temperatures without damage. Typical optically clear thermoplastic polymer fibers tend to degrade at temperatures above 85° C. Further, heat filters can only provide a limited protection to fibers in the best of cases.

In addition, a large size becomes difficult to attain. In order to manufacture plastic optical fibers of a diameter greater than ⅛" out of these thermoplastic polymers, plasticizer may be added to the mixture to make them flexible. The addition of a plasticizer tends to further lower the service temperature of the resulting fiber, making it susceptible to temperature-caused degradation even at temperatures lower than 85° C.

The heating problem associated with using high intensity pumping close to a transmission fiber has been addressed by various illuminator configurations. In U.S. Pat. No. 5,111,367, Churchill discloses an illuminator with means for dissipating heat. The light is not focused, but is allowed to emit in all directions, and therefore the various fibers only collect a small percentage of the total light output of the lamp. Accordingly, the collection efficiency in this scheme is low. The resultant smaller collection angle obtained with this configuration will yield a lower overall temperature at the fiber end; however, much potentially usable light intensity is sacrificed.

The fiber optic illuminator described in U.S. Pat. No. 4,704,660 of Robbins has attempted to cool the apparatus by using a clear transparent fan blade interposed between the light (and heat) source and the entry point to the end of the fiber. The fan provides cooling at the expense of some focusing efficiency of the reflector, because of the diffusing effect of the fan blade passing between the light source and fiber input.

In trying to approximate a neon-like effect, prior art patents have used optically clear fibers and have succeeded in generating only a relatively low intensity glow. Significant obstacles need to be overcome regarding efficient heat removal at the fiber input end, in order to obtain enough power to simulate a true neon-like look with these configurations.

For illumination purposes, then, a significant need exists for a light conduit which has the properties of being able to transmit light effectively while allowing a large portion of light to escape uniformly at high intensity along its length. A need exists for a light conduit that would further be able to be manufactured in larger diameters, be of light weight, flexible, rugged, and capable of operating under high service temperatures and adverse environmental conditions. This conduit should be relatively economical to manufacture and able to transmit light in colors ranging across the visible spectrum bandwidth (from 400 to 750 nm).

SUMMARY OF THE INVENTION

Several objects of the present invention can be enumerated, as follows:

It is an object of the present invention to provide an optical fiber suitable for illumination applications.

It is an object of the present invention to provide an optical fiber that provides a bright glowing neon-like effect.

It is an object of the present invention to provide an optical fiber that transmits light well at the visible bandwidth of the spectrum (from 400 to 750 nm), while allowing a substantial quantity of the light to escape uniformly along its length.

It an object of the present invention to provide an optical fiber that is of large diameter, flexible, rugged, lightweight, relatively economical to manufacture, and capable of sustaining high service temperatures.

According to the present invention, an optical fiber is provided for illumination applications. The basis of the present invention is a novel material, that can be used for the core or the cladding layer of the fiber of the present invention. This document describes the composition of the novel material, a method of manufacturing optical fibers using the material, and illumination applications of the fibers.

The optical fiber of the present invention manufactured using the method and materials of the present invention are of large diameter, lightweight, flexible, rugged, capable of high service temperatures, relatively economical to manufacture, and transmit light well, while allowing a lot of light to escape from the cladding at the visible bandwidth, and further does so substantially evenly along its length.

The present invention is an optical fiber doped with high quantum efficiency dyes such as those used for dye lasers. These dyes cause the fiber to fluoresce in various colors, which are determined by the composition of the fiber itself. This is a different method for creating color in fiber than methods used in prior art, which utilized a clear fiber with a changing color wheel to create color effects. Accordingly, a proper name for the fiber of the present invention is fluorescent optical fiber or just fluorescent fiber.

The fluorescent optical fiber of the present invention is prepared using a monomer, typically the monomer methyl methacrylate (MMA) [$CH_2$=$C(CH_3)COOCH_3$], that is cross-linked by an agent, typically allyl diglycol carbonate (CR-39), initiated with 2.2'-Azo-bis (2 Methylpropionitrile) [$(CH_3)_2C(CN)N$=$NC(CH_3)_2CN$], into which a laser dye or mixture of dyes is dissolved, with the mixture being thermoset under pressure into Teflon® tubing.

The fluorescent optical fiber of the present invention exhibits highly fluorescent radiance when illuminated with various light sources, because the dye in the core fluoresces when the light from these sources impinges upon it. This light radiates in all directions from the fluorescing dye, which is in contrast to the straight-line travel of the "pumping" light source. Put another way, the pumping light (that might ordinarily exit the fiber as end light) is absorbed by the fluorescent dye dissolved in the material, and becomes converted into fluorescing light (emitted at a longer wavelength than the one absorbed) which mostly exits the fiber as side light. This side light radiance emerges with an intense glowing effect, similar in appearance to the glow of discharge-type tubing such as neon, argon, helium, etc. The fiber exhibits a highly fluorescent, saturated color, with a higher light output than that created in prior art, and without the need for the color filters, gels, and inefficient lighting sources described in the prior art. The output of the glow effect from the new fiber, like the output of discharge tubes, is substantially monochromatic.

The fluorescent fiber of the present invention has a service temperature of 120° C. (at the pumping end), and, in certain cases, even as high as 150° C. intermittently. The fiber is flexible, rugged, lightweight, and can be economically produced as a large diameter fiber.

According to a further embodiment of the present invention, the fluorescent fiber may be doped with a light scattering medium such as a particulant for an increased glow effect.

According to yet another embodiment of the present invention, a fluorescent optical fiber is provided that is hollow-core, double-clad, and contains the above described fluorescing material sandwiched between the two cladding layers. This embodiment allows for the insertion of an integral pumping light source within the hollow core.

Also disclosed are a method of preparation for the fluorescent optical fiber of the present invention.

Several instances of illumination applications are included in the disclosure; for example, graphic signs which can be made by bending the fiber of the present invention in appropriate shapes. These graphic signs would be large diameter, bright, durable and rugged.

These and other objects and advantages of the present invention will be more apparent and better understood through consideration of the following drawings and the detailed description of the invention that follows.

BRIEF DESCRIPTION OF THE DRAWINGS

FIG. 3C shows a graphic representation of exothermic heat during a polymerization reaction that occurs in the formation of the fluorescent optical fiber of the present invention.

FIG. 10 illustrates a chain-type arrangement of fiber and illuminator connections used for illuminating each end of a plurality of illumination fibers.

FIG. 19A illustrates a fluorescent optical fiber of the present invention being optically end pumped by a laser.

DETAILED DESCRIPTION OF THE INVENTION

The present document describes a novel material and a method of manufacture of fluorescent optical fibers using this novel material. This document further describes illumination applications for the fluorescent optical fibers of the present invention.

Figure 1:
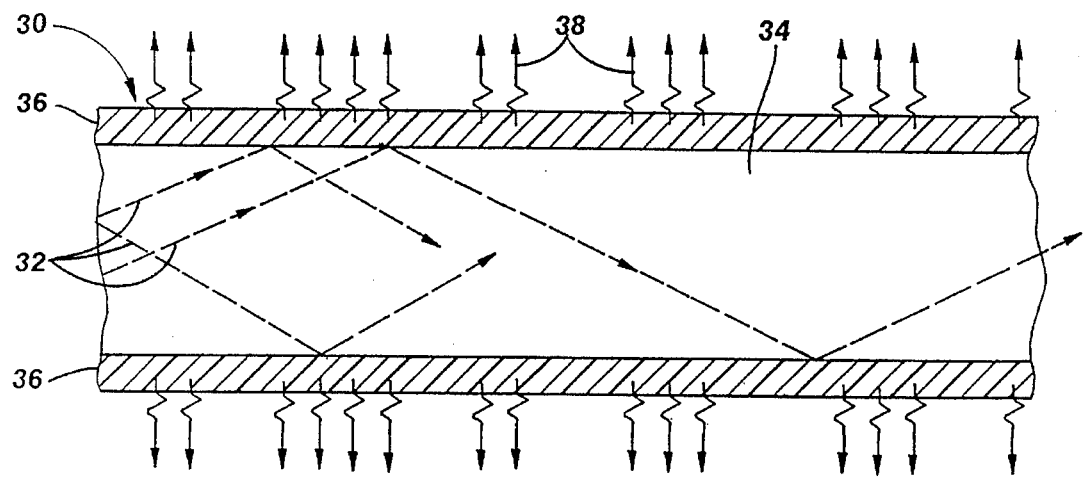
FIG. 1 illustrates a section of the fluorescent optical fiber of the present invention.

In FIG. 1 a section of the fluorescent optical fiber 30 of the present invention can be seen. Light rays 32 propagate through the core 34, subject to total internal reflection by the transparent cladding 36. In addition, side light (shown by rays 38) is emitted through the transparent cladding 36.

MATERIALS

The fluorescent optical fibers of the present invention contain a novel material, which can be used in the core or the cladding layer of the fibers. The novel material is fluorescent, and is cast in the form of an optical fiber to capitalize on the waveguiding phenomenon.

The material of the present invention is initially a mixture of a monomer and a cross-linking agent, combined in a certain controlled percentage ratio. Within the mixture there has been diluted one or more fluorescent, high quantum efficiency laser dyes. To this co-monomer mixture there is then added a free radical initiator. The final resulting mixture is then polymerized to produce the novel material of the present invention. For best results, it is desirable to use ingredients of a high degree of purity and processed with closely monitored time and temperature constraints.

The monomer preferred is methyl methacrylate, hereinafter abbreviated as MMA [$CH_2=C(CH_3)COOCH_3$]. MMA is an advantageous material, because it is highly transparent, crystal clear, and has a high refractive index of from 1.5136 to 1.4850 at wavelengths from 365 nm to 852 nm. The preferred cross-linking agent is allyl diglycol carbonate, which is also known as CR-39. The free radical initiator preferred is 2.2'-Azo-bis 2-methylpropinonitrile, with a chemical formula of $(CH_3)_2C(CN)N=NC(CH_3)_2CN$, which belongs to the Azo-compounds group, which are those having cyano groups on the carbons attached to the Azo linkages.

Although the present invention will be described with reference to specific chemical compositions and proportions, such is by way of example and not of limitation. Other types of co-polymers and monomers can be used in order to achieve similar results, and so the present invention is not limited to the materials named above. Each of the materials cited in this document as preferred embodiments are intended to be a representative of a full family of equivalent materials. A partial tabulation of some of the families of equivalent materials which may be substituted is shown in U.S. Pat. No. 5,122,580 to Zarian, which is hereby incorporated by reference. In Table 1 Zarian lists other materials that could be used instead of the MMA preferred in the present invention. Further, it is possible to generate different formulations based on polymers such as poly(acrylics), poly(styrenes) and derivatives of poly(styrenes), poly(carbonates), and poly(esters). Further, in Table 2 Zarian lists other cross-linking agents that could be used instead of the CR-39 of the present invention. And in Table 3 Zarian lists free radical initiators that could be used instead of the initiator of the present invention. Other free-radical initiators in the same category as the 2,2-Azo-bis [2 Methylpropionitrile] have been found to be useful. There is a majority of other free-radical initiators which are used extensively for clear fiber production, which would not be suitable to be used as initiators in the process described in the present invention. Peroxydicarbonates and peroxides such as diisopropyl, di-secbutyl and di-n-propyl peroxydicarbonates (IPP, SBP, and NPP) are not suitable as free-radical initiators, since they will cause bleaching of the organic laser dye molecules used in producing the fluorescent fiber of the present invention.

The ratio of MMA/CR-39 in the initial mixture is one of the determining factors defining the properties of this novel material. The ratio is usually given as two percentages by volume of the two compounds. The percentage by volume of MMA should be between 35% and 65%, and accordingly the percentage of CR-39 would be 65% to 35%. If the MMA is present at less than 35%, then the resulting material will have poor mechanical properties (i.e., will crumble), whereas if the MMA is more than 65% in the initial mixture, then the resulting material will be inflexible (i.e., will not provide the properties ideal to flexible fiber).

The mixture is initiated by a free radical initiator, introduced into the mixture at the specific concentration of 0.5 to 1 gram per liter.

At this stage, the MMA/CR-39 mixture will be doped with one or more high quantum efficiency fluorescent dyes, such as the type used for dye lasers. Unlike pigments, these dyes are capable of dissolving into the MMA/CR-39 mixture at the molecular level.

Figure 22A:
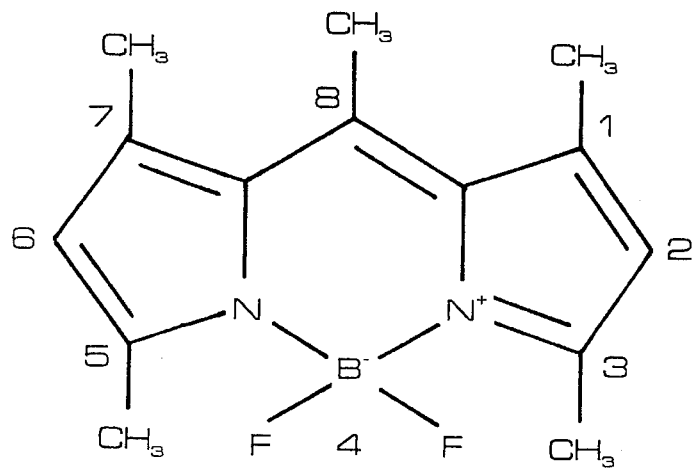
FIG. 22A illustrates the molecular structure of Pyrromethene-BF complex dye, the preferred laser dye group of the present invention.
Figure 22B:
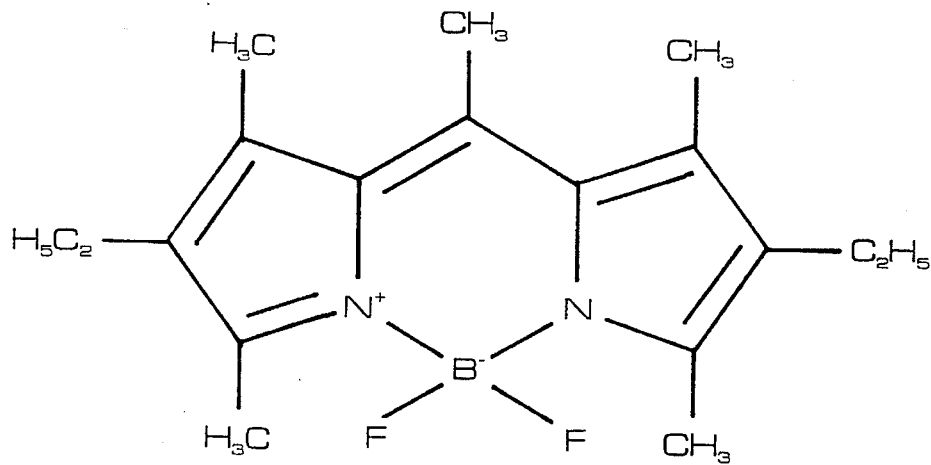
FIG. 22B illustrates the molecular structure of the Pyrromethene 567 laser dye.
Figure 22C:
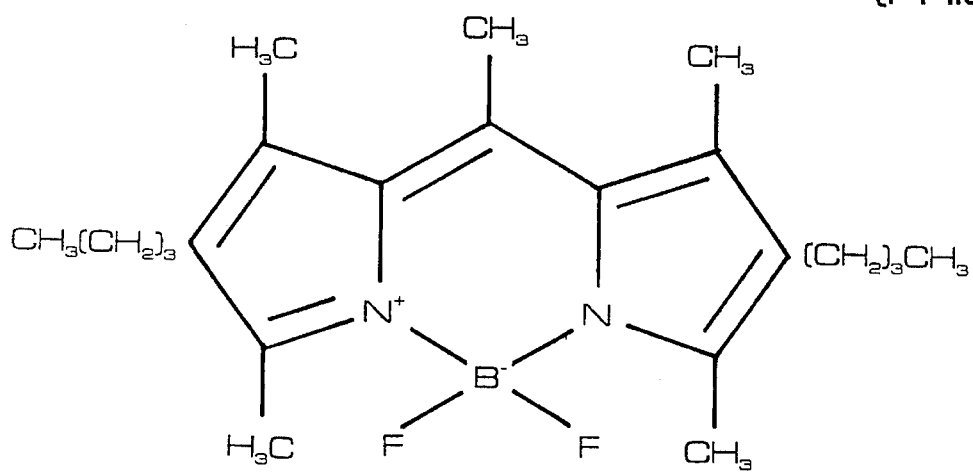
FIG. 22C illustrates the molecular structure of the Pyrromethene 570 laser dye.

The preferred groups of laser dyes are the Cyanine (red to IR), Pyrromethene (yellow to red), Xanthene (600 nm), Coumarin (blue - green), Oxazole (400 nm), and Conjugated Hydrocarbon (UV) families. Partial listings of members of various families of fluorescent dyes follow:

Pyrromethene family: Pyrromethene 597 [1,3,5,7,8-pentamethyl-2,6-di-t-butylpyrromethene-difluoroborate complex], Pyrromethene 567 [1,3,5,7,8-pentamethyl-2,6-diethylpyrromethene-difluoroborate complex], Pyrromethene 556 [Disodium-1,3,5,7,8,-pentamethylpyrromethene-2,6-disulfonate-difluoroborate complex], Pyrromethene 546 [1,3,5,7,8,-pentamethylpyrromethene-difluoroborate complex], Pyrromethene 580 [1,3,5,7,8-pentamethyl-2,6-di-n-butylpyrromethene - $BF_2$ complex], Pyrromethene 570 [1,3,5,7,8-pentamethyl-2,6-di-n-butylpyrromethene - $BF_2$ complex] (The known molecular structure of some of these molecules is shown in FIGS. 22A, 22B, and 22C.);

Coumarin family: Coumarin 152 (Coumarin 485 [7-Dimethylamino-4-trifluoromethylcoumarin]), Coumarin 339, Coumarin 1 (Coumarin 47; Coumarin 460 [7-Dimethylamino-4-methylcoumarin]), Coumarin 138 [7-Dimethylamino cyclopenta- coumarin], Coumarin 102 (Coumarin 480), Coumarin 151 (Coumarin 490 [7-Amino-4-trifluoromethylcoumarin]), Coumarin 314 (Coumarin 504), Coumarin 30 (Coumarin 515), Coumarin 307 (Coumarin 503 [7-Ethylamino-6-Methyl-4-trifluoromethylcoumarin]), Coumarin 334 (Coumarin 521), Coumarin 343 (Coumarin 521), Coumarin 7 (Coumarin 535 [3-(2'-Benzimidazolyl)-7-N,N-diethylaminocoumarin]), Coumarin 6 (Coumarin 540]);

The most notable members of the Xanthene family are the Rhodamines, whose family includes: Rhodamine 110 (Rhodamine 560), Rhodamine 6G Tetrafluoroborate (Rhodamine 590 Tetrafluoroborate), Rhodamine 6G Perchlorate (Rhodamine 590 Perchlorate), Rhodamine 6G (Rhodamine 590), Rhodamine B (Rhodamine 610);

Sulforhodamine family: Sulforhodamine B (Kiton Red 620; Xylene Red B), Sulforhodamine 101 (Sulforhodamine 640);

Fluorescein family: Fluorescein (Fluorescein 548; Fluorescein 27), 2'-7'-Dichlorofluorescein;

Oxazine family: Oxazine 4 Perchlorate (LD690 Perchlorate), Oxazine 170 Perchlorate (Oxazine 720 Perchlorate);

Miscellaneous: Carbostyril 124 (Carbostyril 7 [7-Amino-4-methylcarbostyril]); Cresyl Violet Perchlorate (Oxazine 9 Perchlorate; Cresyl Violet 670 Perchlorate).

The above list of laser dyes is intended as an example and not as a limitation. Dyes not mentioned in the above list may be used to practice the present invention. The dye concentrations are also important, as will become apparent by the examples hereinbelow.

Under the appropriate conditions, the following dyes will fluoresce brightly in the blue: Coumarin 460, Exalite 392 (as well as Exalite 411, 417, 404, 428), Coumarin 503. Deep violet-blue fluorescence can be achieved using fiber doped with LDS 751 dye under long wave ultraviolet light source, and when illuminated by a tungsten halogen light source, the same fiber emits a magenta color output.

Numerous dyes in the Coumarin family exist from blue-green to green- yellow which will produce a deeper green under long ultraviolet excitation and a yellow-green under tungsten halogen lighting. Yellow fluorescing fibers such as the Pyrromethene 567 produce a bright saturated light in the yellow region when excited with white or ultraviolet light. Pyrromethene 597 is the leader in quantum yield, fluorescing in the orange spectrum. It produces a bright saturated orange light under ultraviolet or white light illumination.

Also LD 688 dye has an orange saturated output. LDS 698 produces an orange-red color in the red region of the electromagnetic spectrum. There are numerous dyes which can provide a red spectrum ranging from a light red color to a saturated deep red. Some of the dyes in this category include Rhodamine 640, which produces a highly saturated deep red fluorescent fiber. Fiber has also been made utilizing infrared dyes such as LDS 867, LDS 751, LDS 821, LDS 923, etc. This particular fiber has only limited fluorescent levels in the visible range, which somewhat improve under ultraviolet illumination.

PROCESS OF MANUFACTURE

In short, the process of manufacture of the fluorescent fiber of the present invention is as follows: An initial mixture is constructed that comprises a monomer and a cross-linking agent to cross-link the monomer. Then a final mixture is constructed by adding a laser dye and a free radical initiator to the initial mixture to initiate a polymerization reaction. Finally, the final mixture is heated.

Figure 2:
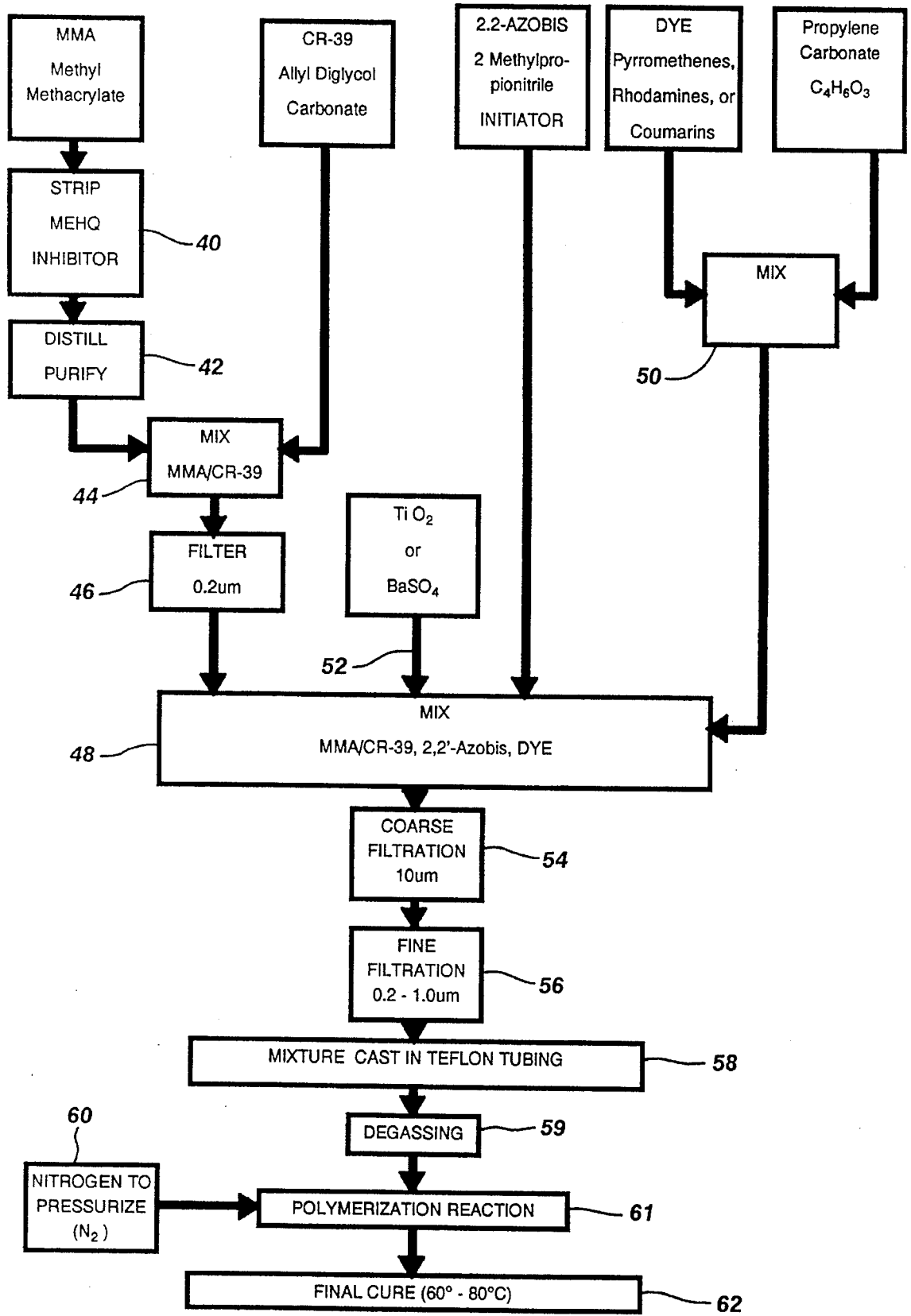
FIG. 2 illustrates a flow diagram of a manufacturing process for the fluorescent optical fiber of the present invention.

Referring now to FIG. 2, the steps for a process of manufacture of the fluorescent fiber of the present invention will be described in more detail. It is generally desired to purify the various chemical ingredients that will be used, to insure conformity in the manufacturing process of the fluorescent fiber.

When MMA is shipped by a manufacturer, it typically contains an inhibitor, a material added by the manufacturer to increase the shelf life and prevent uncontrolled polymerization. According to manufacturing process, the inhibitor (MEHQ) is removed 40. There are a number of known ways to remove the inhibitor in this monomer, such as rinsing the MMA with a NaOH aqueous solution, followed by several washing steps with distilled water to remove any remaining sodium hydroxide. The monomer is then dried over anhydrous materials.

The MMA is then distilled 42 under reduced pressure.

CR-39 is another monomer, used as a co-monomer with MMA, to provide cross-linking. According to a subsequent step of the manufacturing process, the two monomers are mixed 44. The mixing step 44 happens preferably in a stainless steel container for a period of 30 minutes. It is at this time that the aforementioned MMA/CR-39 ratio is determined. For purposes of describing a manufacturing process in conjunction with FIG. 2, it is assumed that the specific proportions of MMA/CR-39 are 60%/40%. Such values are used by way of illustration and not of limitation.

According to a subsequent step 46 of the manufacturing process, the mixture of the two monomers is then filtered 46 through a PTFE membrane filter at reduced pressure. The PTFE membrane filter is preferably 0.2 µm.

In a subsequent step 48 of the manufacturing process, the filtered mixture of the two monomers, along with an initiator and a laser dye, are then added 48 into a main mixing container, wherein they all are mixed 48 together.

The concentration of the laser dye could be anywhere between $1 \times 10^{-5}$ to $1 \times 10^{-2}$ moles, depending upon the desired wavelength, saturation, and transmission characteristics desired, and also depending upon which particular dye is being used. Such considerations will make different dyes more suitable for specific applications.

The above mentioned step of mixing 48 is facilitated when the dye being used is directly soluble in the MMA/CR-39 mixture. When that is the case, the dye may be added in the main mixing container 48 without any intermediate steps. The above listed pyrromethene dyes are preferred, in that they are directly soluble in a 60–40 MMA/CR-39 co-monomer mixture. When a dye is not directly soluble in the co-monomer mixture, an additional intermediate step 50 must be performed. The dye should be first dissolved 50 into a solvent such as propylene carbonate ($C_4H_6O_3$) to make a solution. Then the dye is added 48 to the main mixing container in the form of a solution.

Optionally at this point a scattering agent or medium may be added 52 in the main mixing container. $TiO_2$ (titanium dioxide) or $BaSO_4$ (barium sulfate) in the form of particles will work well as a scattering medium. The best results were achieved with $TiO_2$ nanoparticles, which have an average diameter of 0.25 µm, and have been coated with a thin layer of aluminum oxide ($Al_2O_3$) to prevent flocking. Preferably, the particles have gone through a settling and filtration process (to be explained in the subsequent example). The particles will be suspended in the mixture. The density of the titanium dioxide ($TiO_2$) nanoparticles ranges from $5 \times 10^9$ to $2.5 \times 10^{12}$ cm$^3$. Fiber has also been made by adding nanoparticles in quantities ranging from 0.5 to 2.0 grams per liter of co-monomer dye mixture.

An example of preparation of scattering particles for the mixture is as follows: to produce 1 liter of co-monomer mixture, doped with fluorescent dyes and with the nanoparticles suspended, 5% (or 50 ml) of the quantity of the monomer mixture without initiator is preferably separated, and a quantity of the nanoparticles is added to it, and stirred with a stir bar for approximately 1 hour. The material so mixed is then poured into a 50 ml graded cylinder. After approximately 12 hours of sedimentation time, about 70% of the mixture is removed from the top of the cylinder (leaving the sediment at the bottom) for mixing with the rest of the monomer, dye, and initiator. After mixing and stirring for 1 hour, the mixture is then fed into the FEP (Tetrafluoroetheleneperfluoroproplene) Teflon® tubing, and polymerized as described earlier in this text. This sedimentation technique has provided more uniform distribution of the nanoparticles throughout the final product.

Figure 3A:
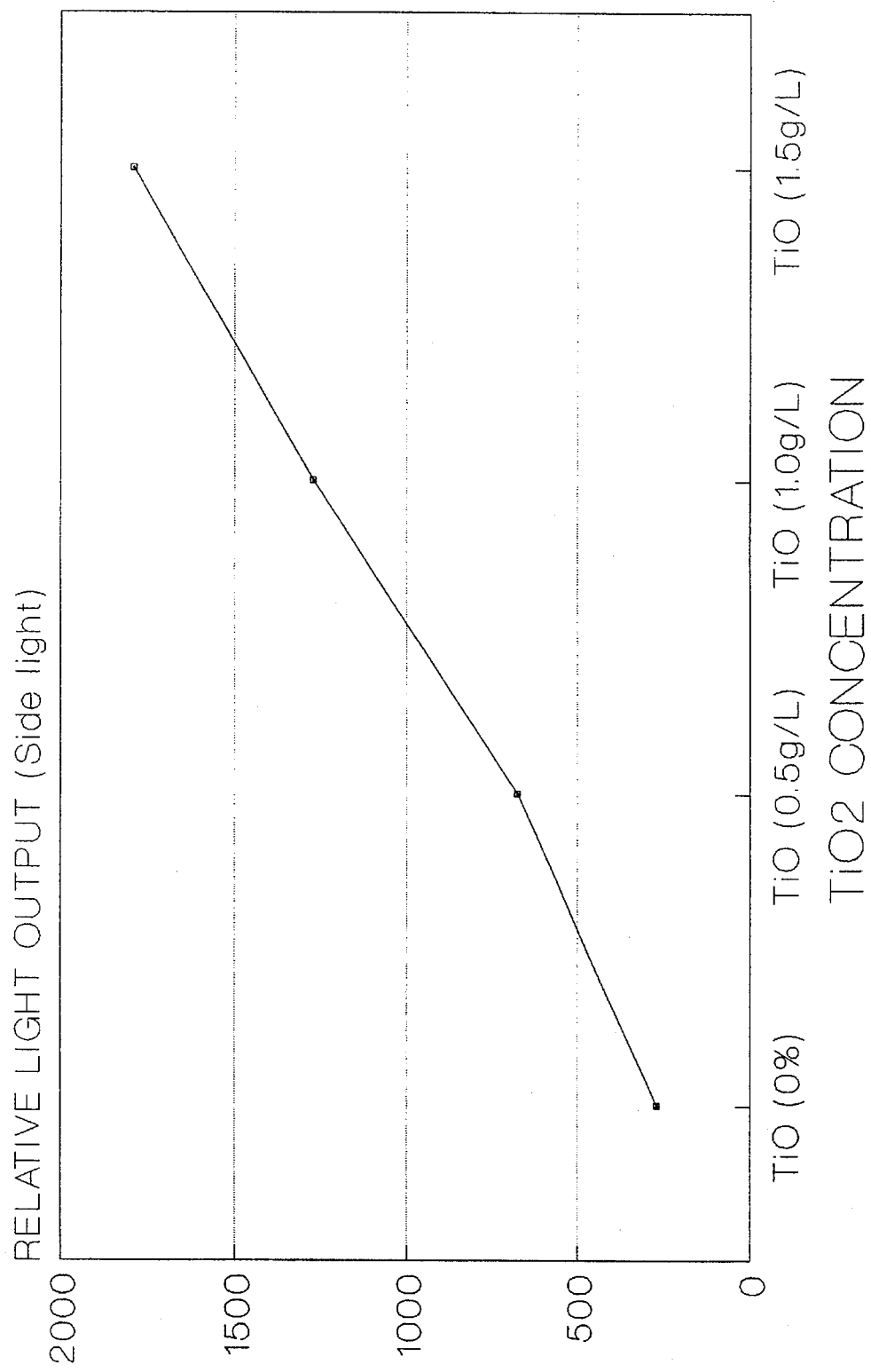
FIG. 3A shows a performance characteristic of a fluorescent optical fiber that has been doped with a Pyrromethene 597 fluorescent dye and $TiO_2$ nanoparticles.

FIG. 3A shows a performance characteristic of a Pyrromethene 597 fluorescent fiber, doped with varying concentrations of $TiO_2$ nanoparticles. The light output from the side of the fiber was measured using a combination of two integrating spheres; a smaller 6" sphere used as the illuminator which was internally lit by an indirect tungsten halogen lamp powered by a regulated stable power supply. Four lengths of 3' long fiber were used for the four data points, the fibers having increasing amounts of $TiO_2$ nanoparticles. The other end of each measured fiber was passed through a larger 12" integrating sphere, where the light output from the sides of the fluorescent fiber was collected, measured with a silicon detector/transimpedance amplifier, and plotted in FIG. 3A.

As can be seen in FIG. 3A, the light output from the side of the fluorescent fiber appears to increase almost proportionally with a proportional increase in the scattering medium, for the studied range of $TiO_2$ nanoparticle concentrations.

Figure 3B:
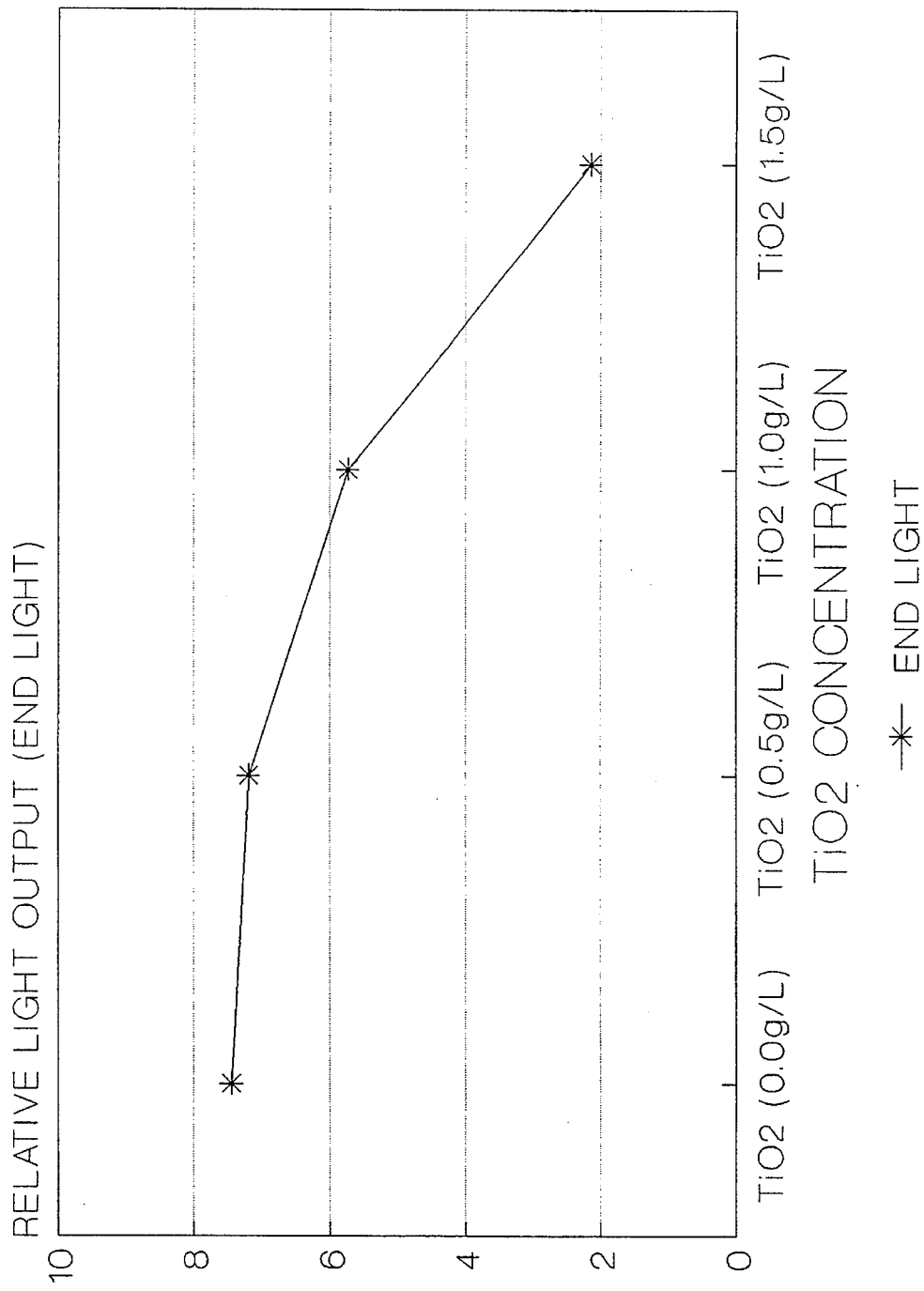
FIG. 3B shows a performance characteristic that is complementary to the performance characteristic of FIG. 3A.

FIG. 3B shows a performance characteristic of the above fiber that is complementary to the performance characteristic of FIG. 3A. In particular, it shows the light output at the end of the fiber being attenuated dramatically with the increase of scattering medium. This is also understood from the principle of conservation of energy. When more light energy escapes the fiber through the cladding, less light energy will exit from the output end of the fiber.

Returning now to the description of FIG. 2, the above described chemical ingredients are preferably mixed 48 in the main mixing container for a period of 2 hours at room temperature. As a subsequent step 54, the mixture is then filtered 54. A coarse PTFE filter of 10 µm is used.

In a subsequent step 56, the mixture is then filtered 56 again, through a finer filter. If no scattering material is to be used, the PTFE filter is preferably of 0.2 µm, otherwise it is preferably of 1–3 µm. The filtration step is done at reduced pressure to expedite the process.

A Tetra Fluoroethylene-Perfluoropropelene (FEP) cladding tube will be used to contain the material during polymerization, and also to serve as the cladding layer of the finished fluorescent fiber of the present invention. The person skilled in the art will immediately realize that other cladding materials can be used equally as well. The Teflon® tube is preferred because of its superior qualities with regard to environmental factors as well as being inert to MMA/CR-39 and associated solvents used in the manufacturing process, and also because of its ability to be pressurized to over 100 psi. The Teflon® tube is extruded to form a cylinder with a diameter ranging between ⅛" to 1" outside diameter. The cross section of the tube is usually circular, although other shapes of cross sections are possible, as will be explained below. The wall thickness of the Teflon® tube is preferably around 0.02". The length of the tube can be long, e.g. 80 feet or even longer (lengths of up to 150 feet are possible). The Teflon® tube is finally prepared by being capped at one end.

As a subsequent step 58 of the present invention, the mixture of the monomers, the dye, the initiator, and optionally the scattering particles is then fed 58 into the FEP cladding tube. Afterwards degassing 59 is performed under reduced pressure to remove any air bubbles, and other gaseous impurities from the mixture.

Then, the FEP cladding tube is pressurized 60 with nitrogen gas at a pressure of about 80–120 psi. A positive pressure is maintained during the polymerization process that is to follow.

The initiated mixture can be polymerized 61 in two ways: (1) thermally as herein described, and (2) photolytically: where the Azo-compounds are dissociated photolytically by utilizing an ultraviolet light source. The major advantage of inducing polymerization photolytically is that the photolytic reaction is essentially independent of temperature, and can be used to initiate polymerization 61 at temperatures lower than can be practically used with such compounds alone. Also, better control of the polymerization process 61 can be exerted, since the light can be of narrow wavelength bands, and the reaction can be stopped by simply removing the light source.

To initiate the polymerization reaction 61 thermally, heat must be applied to the FEP tube containing the pressurized mixture. The amount of heat required is dependent on the types of monomer and the amount and type of initiator.

The polymerization process 61 takes place as follows: The Teflon® cladding containing the mixture will be polymerized in a liquid bath (polymerization reactor), whose temperature is maintained constant by a temperature controller. The closed end of the Teflon® tube is placed in the liquid bath, along with an 8'–10' length of the tube. The liquid bath performs two important functions: (1) it initiates the polymerization reaction, and (2) it removes the excessive heat generated by the exothermic reaction. After the polymerization reaction is about 90–95% complete, then the next 8'–10' length is placed into the reactor, and so on, until the entire length of the tube is completely polymerized.

The polymerization reaction 61 is exothermic. FIG. 3C shows a graphic representation of exothermic heat during polymerization reaction. In particular, the graph shows the exothermic reaction temperature and the polymerization bath temperature (maintained at 60° C.) for the particular above described mixture of (60–40 MMA/CR-39) versus the reaction time of approximately 60 minutes.

Returning to FIG. 2, the initiated monomer mixture is optimized to polymerize in approximately 1 hour. This basically means that 8'–10' of the fluorescent fiber can be produced per hour, and that it will take approximately 8 to 10 hours for the entire 80' long fiber to be polymerized. This amounts to a substantially higher production speed, when compared to the relatively slow rate of 6–24 inches/hour that is described in U.S. Pat. No. 5,122,580 to Zarian.

For a similar length of 80' of fiber, current methods of polymerization for fibers described in prior art will take 20–48 hours to complete.

After the polymerization reaction 61 is complete, a final cure 62 of the entire length of the tube is performed at about 60° C. to 80° C. Heat treatment of the fluorescent optical fiber will promote further polymerization and annealing of the material. The final cure step used in this process will help inhibit photobleaching quantum yield, which is a photodegradation of dye molecules.

For fibers intended for a specific class of applications (called side pumping applications), the jacket is typically removed from the fluorescent fiber. This is accomplished by scoring the FEP jacket with a sharp instrument along its side and stripping the jacket away from the core material.

EXAMPLES OF MANUFACTURE

Various types of fluorescent fiber have been made from numerous dyes, with light output characteristics spanning the spectrum from blue through near infrared. In the following examples, the process of FIG. 2 was used, with MMA as the monomer, CR-39 as the cross-linking agent, and 2.2'-Azo-bis (2-methylpropinonitrile) as the free radical initiator. The specific quantities of the various materials were as shown below:

Manufacturing Example 1: Fluorescent Fiber doped with Coumarin 535

The percentages of the MMA/CR-39 mixture were 60–40, and the dye was added in the concentration of $5 \times 10^{-4}$ moles. The mixture was poured into a ½" O.D. FEP tubing, having a wall thickness of 0.02". The material was polymerized in a 60° C. distilled water bath for 60 minutes under 100 psi nitrogen gas. A final cure of 3 hours at 80° C. completed the process. The resulting fiber is a highly fluorescent green transparent medium with good optical quality, free of voids and bubbles.

Manufacturing Example 2: Fluorescent Fiber doped with Pyrromethene 567

The percentages of the MMA/CR-39 mixture were 50–50, and the dye was added in the concentration of $3 \times 10^{-4}$ moles. The mixture was poured into a ½" O.D. FEP tubing having a wall thickness of 0.02". The material was polymerized as before, under constant pressure for one hour, with a 2 hour cure at 80° C. The resulting fiber is yellow and it exhibits one of the highest fluorescences, when compared to other dyes in the yellow region. The ratio of 50/50 MMA/CR-39 mixture provides a good fiber with improved flexibility, when compared to 60/40 MMA/CR-39 ratio mixture, although the 60/40 mixture will yield a fiber with better mechanical properties.

Manufacturing Example 3: Fluorescent Fiber doped with Pyrromethene 597

The percentages of the MMA/CR-39 mixture were 65/35, and the dye was added in the concentration of $4 \times 10^{-4}$ moles. The material was polymerized as described in the previous examples, followed by a final cure at 80° C. for 2 hours. The resulting fiber was a high saturation orange fluorescing fiber. This particular dye provided the highest fluorescence of any of the dyes which were tested. The resulting fiber had good optical qualities, and was slightly less flexible than the preferred 60/40 mixture.

Manufacturing Example 4: Fluorescent Fiber doped with Rhodamine 640

The percentages of the MMA/CR-39 mixture were 40–60, and the dye was added in a concentration of $1 \times 10^{-3}$ moles. The material was polymerized for 1 hour, with a final cure of 2 hours at 80° C., and with other parameters the same as in previous examples. The resulting fiber was more flexible than those in the previously described examples, due to the percent increase in the CR-39 in the mixture. The resulting fiber has the advantage of being more flexible, allowing a smaller bend radius, and a slower recovery to its original shape. Even though the fiber in this example has improved flexibility, its toughness and mechanical resistance to various applications may be diminished. However when maximum flexibility is of great importance this may be a suitable composition.

ATTRIBUTES OF THE FINISHED PRODUCT

The resulting product is a thermoset, cross-linked, organic polymer with a high service temperature and high glass transition temperatures. Because of cross-linking between MMA and CR-39, a molecular structure similar to a cage is produced, which limits the mobility of polymer chains, and thus the material has dimensional stability. This thermoset polymer will not melt or flow, and therefore cannot be remolded. It is rugged, of large diameter, and flexible, and can be produced in diameters up to 1". As an optical conduit, it is highly fluorescent and has good light transmitting characteristics. It is free of voids, bubbles, and has excellent core-clad adhesion.

Cross-linking between MMA and CR-39 causes a tremendous increase in molecular weight, and makes the fluorescent fiber generally insoluble in solvents. However, lightly cross-linked polymers will swell in solvents, in which they might otherwise be soluble. The amount of swelling decreases with increasing cross-linked densities, and highly cross-linked polymers swell very little. A test was performed to determine the degree of cross-linking in fibers made according to the method of the present invention. Various fluorescent fibers (cut in 1" pieces) were immersed in various solvents for 48 hours at 30° C., to determine the degree of cross-linking. Some degree of swelling was visible as a result, but none of the samples dissolved. This test, intended to test the degree of cross-linking also demonstrates that the fibers of the present invention are also resistant to various solvents.

The co-monomer mixtures named in the above examples are for the purpose of showing that the variation in the co-monomer mixture can produce different mechanical properties depending on the ratio of the co-monomers. In some applications the ability to produce a cross-linked optical fiber with different mechanical properties is desirable, But, when the ratio of the two co-monomers reaches certain levels, the properties of the fiber will become marginal. Specifically, when the ratio of CR-39 is increased much past 65 to 70%, the core of the resulting fiber could become crumbly and fragile; probably not suitable for most applications. When the MMA monomer is in a concentration higher than 70% in the initial mixture, the resulting fluorescent fiber will become increasingly inflexible. There are many applications where rigidity of an illumination fiber is a desirable trait, for example in cases where permanent shaping by heat into various shapes and forms is required.

Specifically, MMA (methyl methacrylate) and CR-39 (allyl diglycol carbonate) in the specific proportions we disclose herein, in conjunction with high efficiency dyes, have been described; however, variations may be introduced by one skilled in the art which are nonetheless within the scope, spirit, and intent of this invention.

Figure 4:
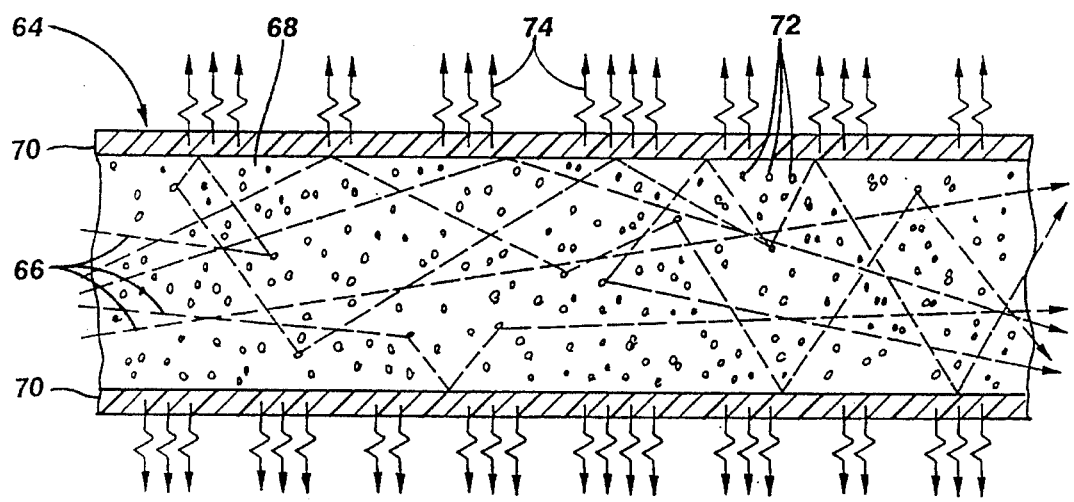
FIG. 4 illustrates a section of a fluorescent optical fiber according to the present invention that is further doped with a light scattering medium.

FIG. 4 illustrates a section of the finished fluorescent fiber 64 of the present invention, that additionally contains a light scattering medium in the form of nanoparticles 72. Light rays 66 propagate through the core 68, subject to total internal reflection by the transparent cladding 70. The rays are also reflected by the nanoparticles 72, further contributing to side light 74.

The fluorescent fiber of the present invention has a service temperature of 120° C. (at the pumping end), and even as high as 150° C. for short durations. It achieves the high temperature tolerance due to its MMA/CR-39 cross-linked co-polymer composition. Even higher service temperatures are possible for intermittent applications; however, the maximum service temperature is limited by the melting point of the dyes present in the material. Some dyes with a melting point higher than 180° C. are available.

Excitation of Fluorescent Optical Fibers

The fluorescent optical fiber of the present invention can be excited to fluorescence by being illuminated or optically pumped by various external light sources, such as visible light (tungsten halogen, metal halide, HMI, xenon, mercury, other lamps), ultraviolet sources (actinic radiation fluorescent tubes and blacklight with 365 nm long wave UV coating), and also by lasers. Indeed, the fiber may fluoresce just from exposure to incidental light sources, including sunlight.

The fluorescing effect occurs over the entire length of the fiber, although it appears brighter at the ends. The color emitted due to fluorescence depends upon the particular dye or mixture of dyes used. The wavelength of the pumping light is preferably within the absorption band of the dye, which is always of a shorter wavelength than the wavelength of fluorescence. For example, to obtain fluorescence in the blue spectrum, a fluorescent fiber must be pumped with ultraviolet light. Lasers are an ideal light source for optically pumping a fluorescent fiber, since (1) they are bright, and (2) the entire output of the laser light is contained in a single wavelength, which can be chosen to match the maximum absorption band of the dye in the fluorescent fiber.

Figure 5:
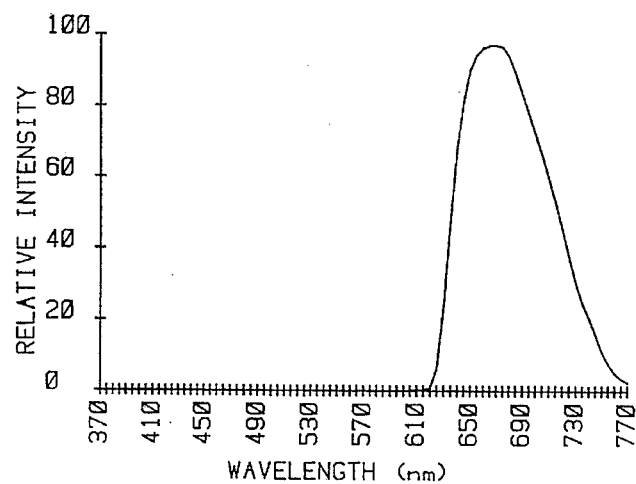
FIG. 5 shows a graphic representation of the spectral response of fluorescence generated by a fluorescent optical fiber of the present invention, when excited with white light.

The light output from these fibers is of a monochromatic nature, as will be explained in conjunction with FIG. 5. Unlike pigments or some other dyes, which tend to act like particle suspensions reflecting light at various wavelengths, the fluorescent fiber of the present invention produces a monochromatic, saturated visual appearance, when illuminated with various types of light sources. The spectrum of the output light of a 3' section of ½" diameter fluorescent fiber was measured, when the fiber was illuminated with a tungsten halogen source. The output light was fed directly into a monochrometer, and a plot of its spectrum appears in FIG. 5. The bandwidth is approximately 50 nm. The spectral output can be further narrowed or broadened, depending upon the dye concentration and/or dye mixture, or the length of the fiber. Light from the side of the fiber is also generated which is radiantly fluorescent, similar in appearance to neon.

ALTERNATE EMBODIMENTS FOR THE SHAPES OF THE CORE AND THE CLADDING

Solid Core Within Cladding

Figure 6:
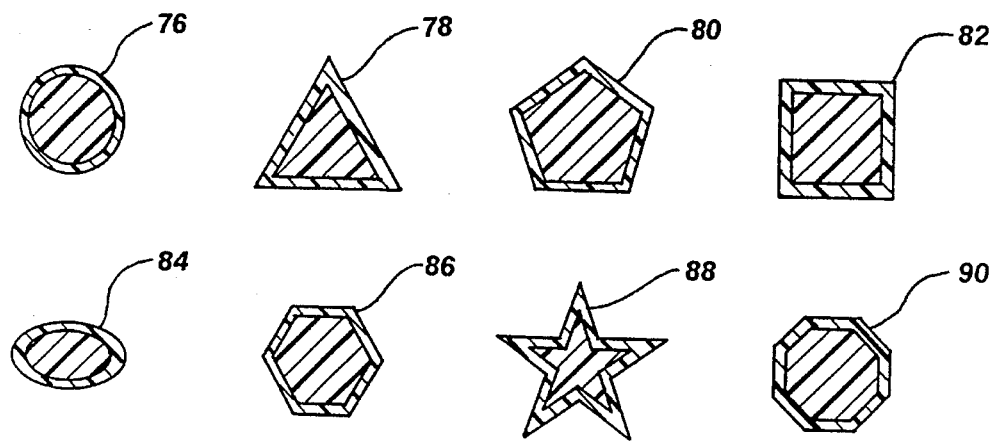
FIG. 6 illustrates examples of possible cross sections for the fluorescent optical fiber of the present invention.

FIG. 6 presents an illustrative variety of cross sections that are possible for the core and the cladding of the fiber of the present invention. Such shapes can be derived by extruding the Teflon® tube in different shapes, as will become immediately apparent to a person skilled in the art, in view also of the present description. Indeed, the fiber can have a cross section that is round 76, triangular 78, pentagonal 80, square 82, elliptical 84, hexagonal 86, star shaped 88, octagonal 90, etc.

Hollow Core

A particular configuration uses the novel material of the present invention in the cladding, while leaving the core area hollow. The embodiment is called hollow-core double-clad fluorescent fiber, and a section of it can be seen in FIG. 7. The fluorescent fiber 92 has a hollow core 94, and a cladding that comprises an inner layer of Teflon® tube 96,. an outer layer of Teflon® tube 98, and an intermediate layer 100 of the novel material of the present invention therebetween. The embodiment is made in the same way as described above, except that the two Teflon® tubes 96, 98 are cylindrical, positioned concentrically, and the material is fed between them, wherein it is polymerized in the same fashion as described above.

Figure 7:
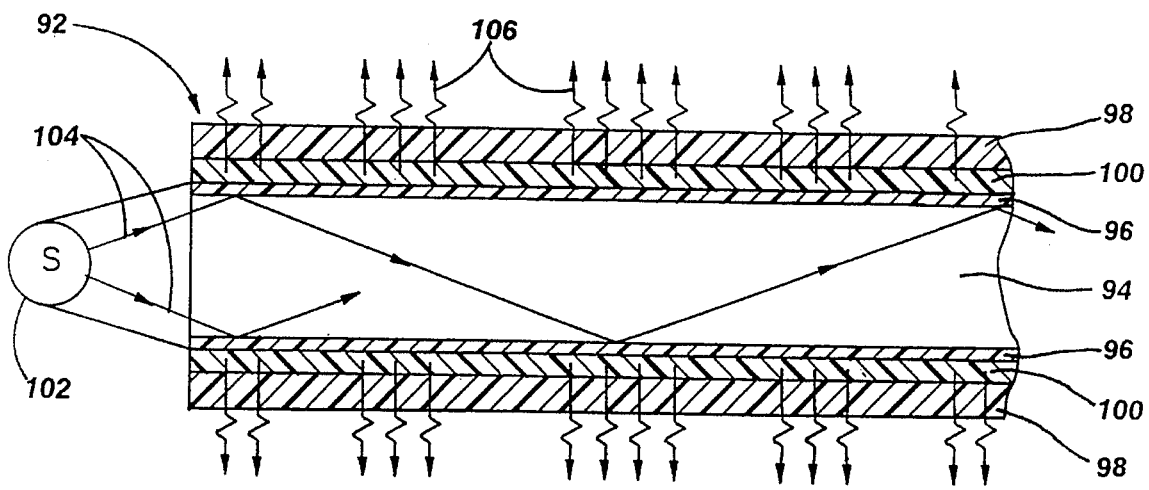
FIG. 7 illustrates a section of hollow-core double-clad fluorescent fiber with laser dye medium between the cladding layers, according to another embodiment of the present invention.

In the configuration of FIG. 7, a light source 102 emits light rays 104, which propagate down the hollow core 94, with side light 106 escaping from the cladding. Optionally for this configuration, the inside Teflon® cladding can be scored along its length and stripped for higher side illumination. Alternately, the Teflon® cladding layers can be removed from the inside and outside, thereby exposing the polymerized hollow core.

Figure 8:
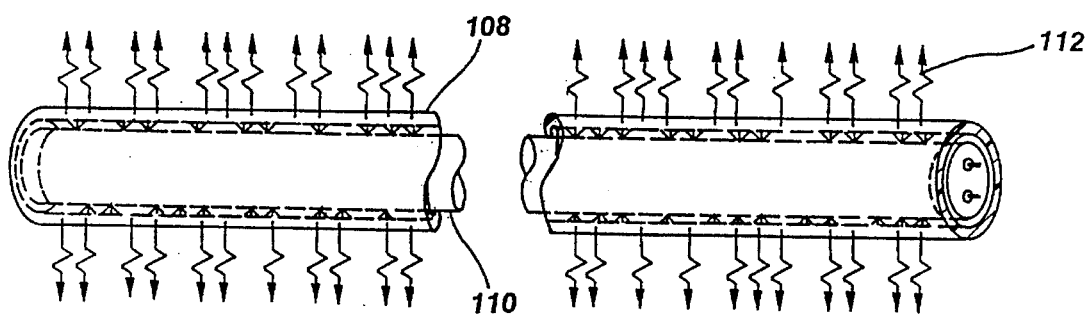
FIG. 8 illustrates the hollow-core double-clad fluorescent fiber of FIG. 7 being used as a sleeve for an ultra-violet (blacklight) fluorescent tube.

An application of the hollow-core double-clad fluorescent fiber of FIG. 7 will now be described in connection with FIG. 8. Blacklight fluorescent tubes emit light in the ultraviolet spectrum. They typically achieve this by having a built-in filter at approximately 365 nm, which utilizes a strong mercury spectral line which occurs at approximately the same wavelength. The hollow core embodiment 108 of the present invention can be used as a sleeve over such a blacklight fluorescent tube 110. When in operation, the large diameter optical conduit 108 will absorb the shorter wavelengths generated from the discharge fluorescent tube 110, and will emit this absorbed energy as light 112 at a longer (visible) wavelength along its outer surface. The color emitted depends upon the particular dye or dye mixtures used. Thus, different sleeves 108 can allow a single blacklight source 110 to present a variety of different visible colors.

ILLUMINATION APPLICATIONS OF FLUORESCENT FIBERS

Types of Illumination Applications for Fibers

The fluorescent optical fiber of the present invention can be used as an illumination fiber. Applications whereby light escapes from the cladding of the fiber are called side illumination applications. Applications whereby light is intended to come out of the end of the fiber are called end illumination applications. Illumination applications are called mixed when they are both side illumination and end illumination applications.

As will also be seen below, illumination applications can be further differentiated by the geometry of optical pumping into end pumping and side pumping applications.

Side Illumination Applications for Fluorescent Fibers

Some side illumination applications for fibers are graphic signs, in that the continuous length of the fiber can be formed to represent a line of writing. Another type of side illumination application is where diffuse lighting is required, such as in the interior of vehicles such as dashboard or control illumination.

Fiber optics used for illumination purposes are typically end pumped. For maximum brightness, it is preferred that both ends of an illumination fiber be pumped simultaneously by a light source, as is done in the configurations of FIGS. 9, 10, and 11.

Figure 9:
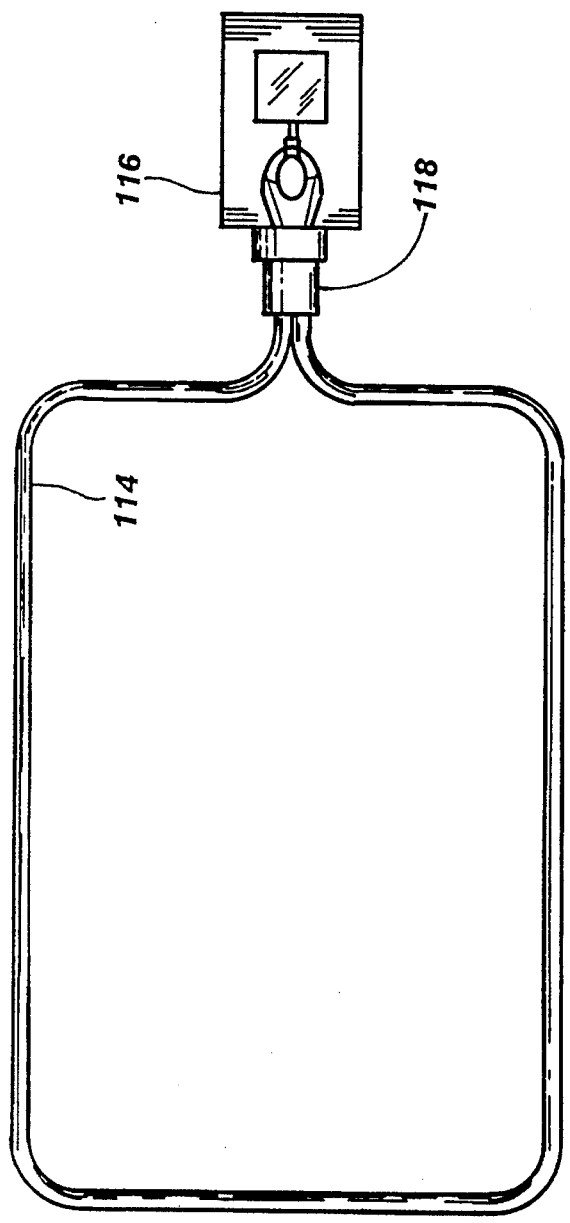
FIG. 9 illustrates a way of illuminating both ends of a single illumination fiber with a single light source.

In FIG. 9 both ends of a illumination fiber 114 are being illuminated by a single light source 116, to which they are connected by a Y connector 118. This way the illumination fiber 114 forms a closed loop.

In FIG. 10, four illumination fibers 120, 122, 124, 126 form a loop. The two ends of each pair of neighboring fibers are connected by a Y connector 118, and illuminated by a single light source 116, similarly to the connections of FIG. 9. The chain-type of fiber and illuminator connections of FIG. 10 may be used when long lengths of the illumination fiber must be optically pumped.

Figure 11:
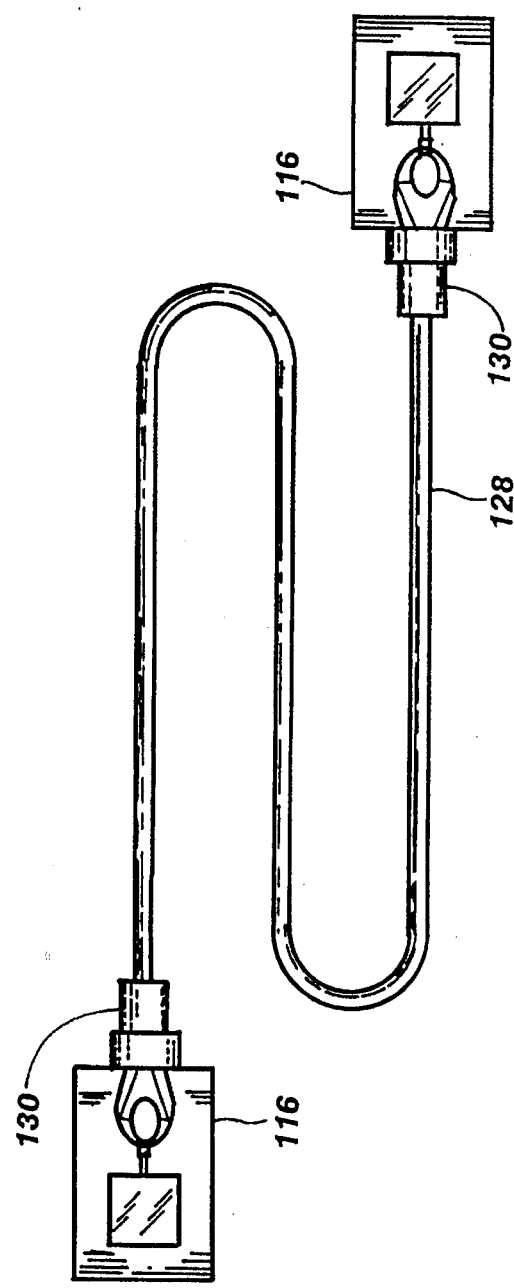
FIG. 11 illustrates an arrangement for illuminating each end of a single illumination fiber with a separate light source.

In FIG. 11, each end of a single continuous length of illumination fiber 128 is connected to a light source 116 via a simple connector 130. The illumination fiber 128 is thus pumped simultaneously by the two separate illuminators 116 to achieve uniform, maximum brightness.

All fluorescent fibers of the present invention inherently have two ends between which there is some waveguiding. If the illumination fiber is to be optically pumped from only one end, it is preferable to have a retro-reflector at the other end of the fiber segment, as will be seen in FIGS. 12, 13, and 14. The retro-reflector is implemented at a first end of the core, and in such a way as to cause retro-reflection back into the core of any core light incident upon the first end.

Figure 12:
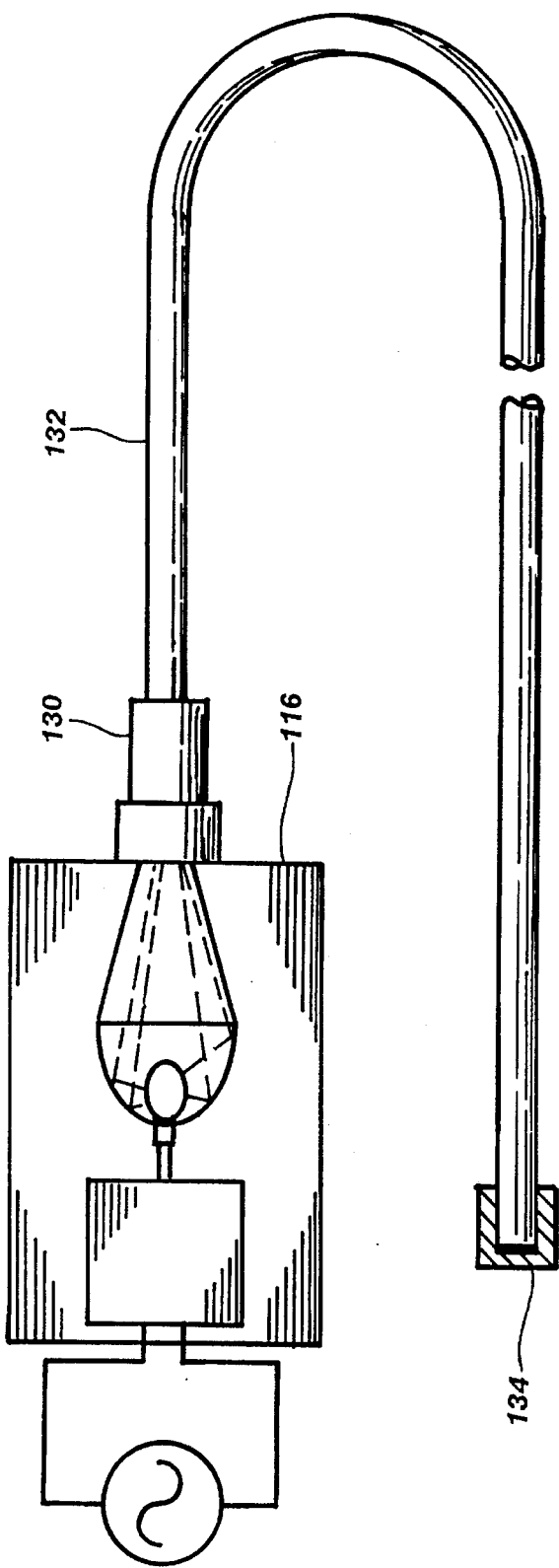
FIG. 12 illustrates an embodiment of an illumination fiber that uses a retro-reflector.

FIG. 12 illustrates an illumination fiber 132 whose one end is optically connected to a light source 116 via a simple connector 130. The other end of the illumination fiber 132 terminates in a retro-reflector cap 134.

Figure 13:
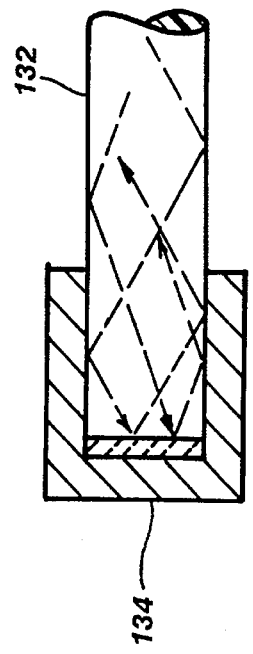
FIG. 13 illustrates a detail of the retro-reflector of FIG. 12.

FIG. 13 illustrates a detail of the retro-reflector cap of FIG. 12. When in operation, the retro-reflector 134 prevents any core light from exiting as end light, and redirects it back through the illumination fiber 132. The redirected light acts as a secondary optical pump, which increases the brightness of the light emanating through the side of the illumination fiber 132. The retro-reflector can be a front surface mirror, which can be attached to the flat surface of the fiber 132 permanently, by using typical optical polymer adhesives. The retro-reflector can also be a vacuum deposited dichroic type mirror.

Figure 14:
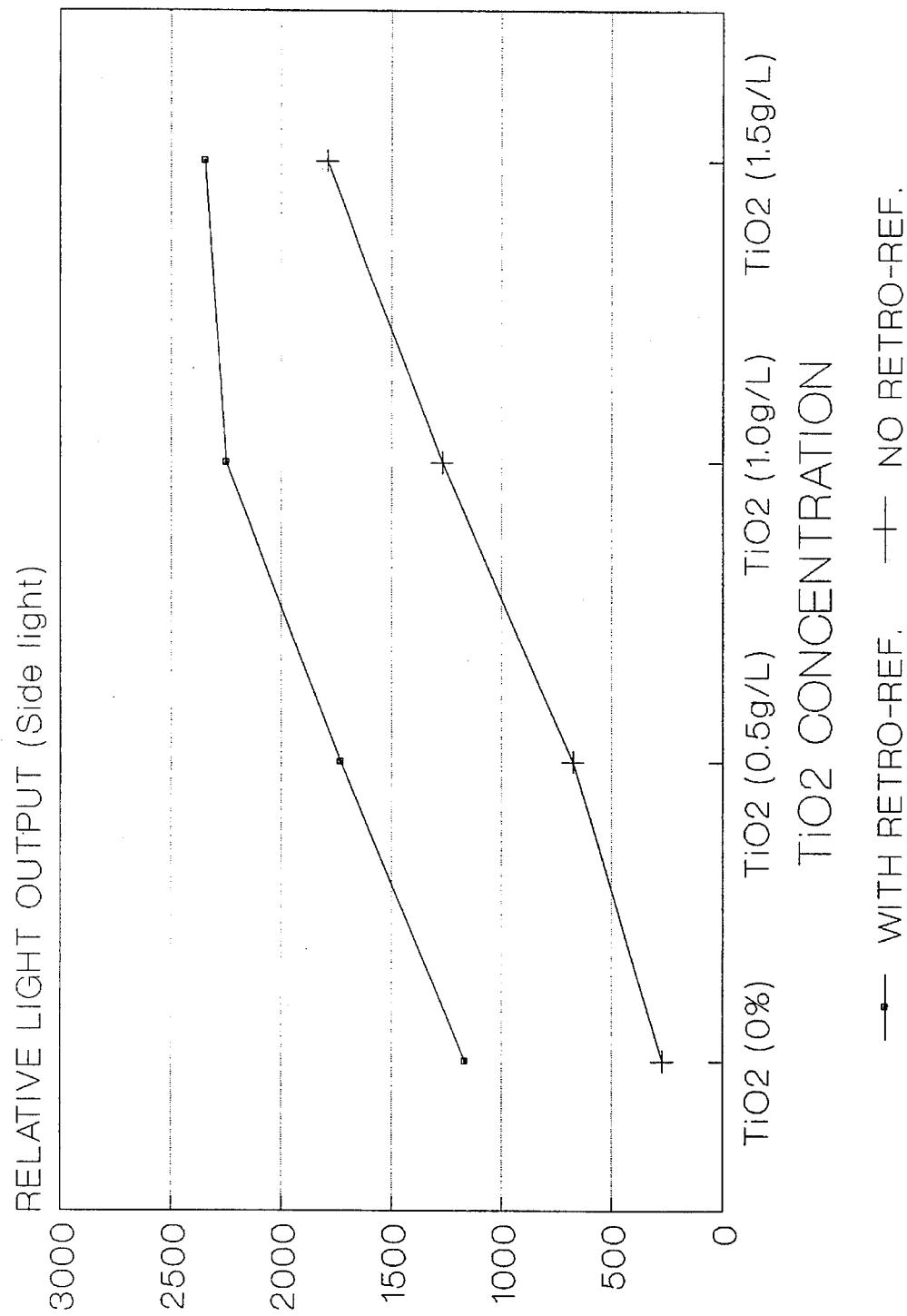
FIG. 14 shows graphical representations of the increase in emitted side light when a retro-reflector is being used, for various concentrations of scattering material in a fluorescent optical fiber of the present invention.

FIG. 14 shows a graphical representation of the improvement in efficiency added by the retro-reflector. The data were produced by measuring the light output of a 4' piece of ½" diameter fluorescent fiber, doped with Rhodamine 640. The experimental arrangement comprised two integrating spheres, one to provide a known amount of light energy to the input end of the fluorescent fiber, and another to measure the light output from the sides of a specific length of the fiber at the retro-reflector end. The reader will recognize that the lower curve of FIG. 14 (the one without the retro-reflector) is the same curve as that of FIG. 3A. The apparatus was tested with ENL 50 W lamp, using 100 mm$^2$ silicon detector with a transimpedance amplifier. The upper curve represents the light output from the same fiber with the retro-reflector in place.

The graph of FIG. 14 also shows the consequences of introducing increasing amounts of the scattering medium in the production of the fluorescent fiber. It is notable that the percent efficiency added by the retro-reflector depends on the concentration of the light scattering medium.

Mixed Illumination Applications for a Plurality of Fluorescent Fibers

Some illumination applications call for a plurality of fibers to be optically pumped simultaneously by a single source. The fibers may be connected serially, as will be seen in FIGS. 15 and 16.

Figure 15:
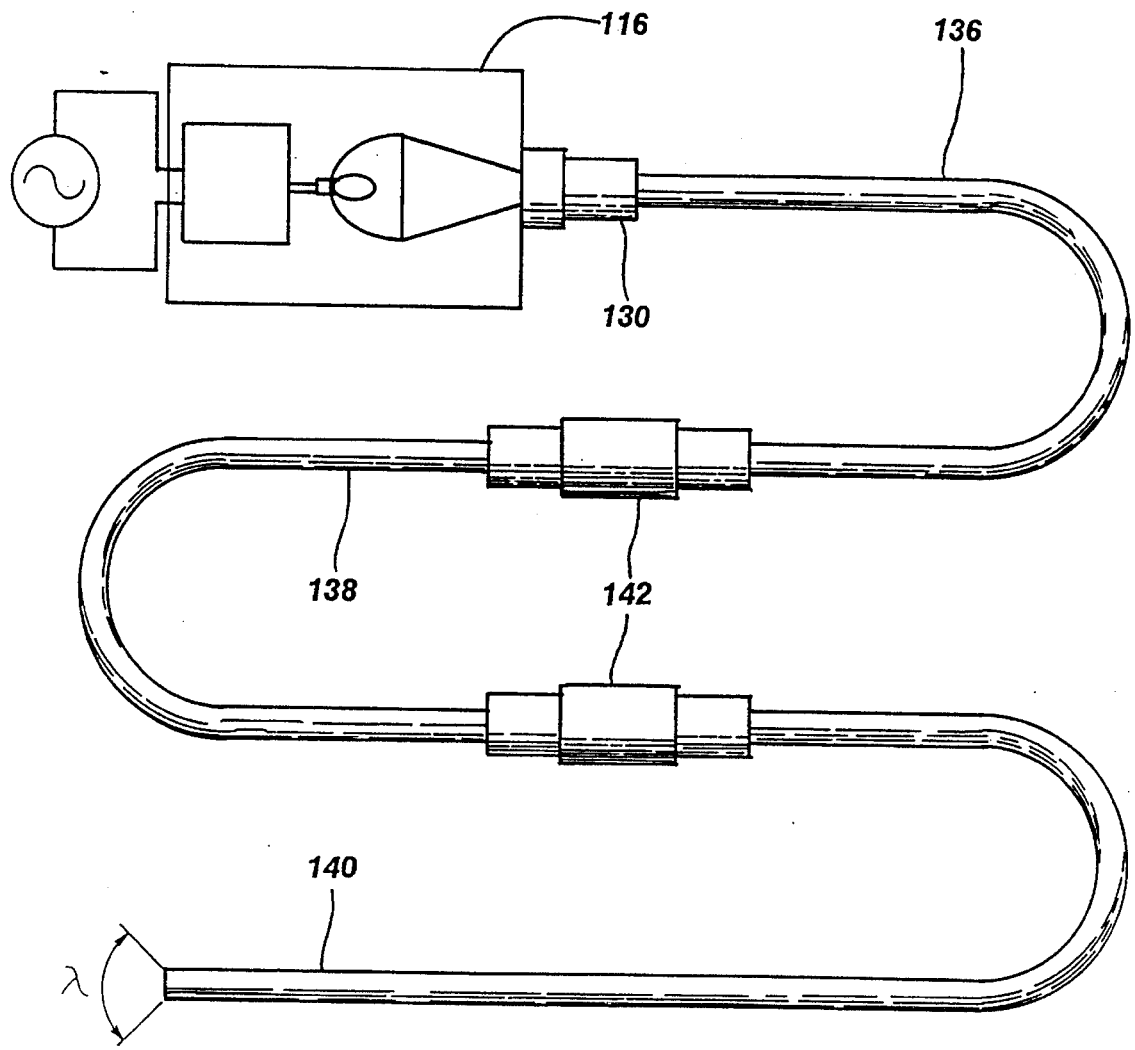
FIG. 15 illustrates three fluorescent optical fibers of the present invention that are connected serially and illuminated by a single light source.

FIG. 15 illustrates three fluorescent optical fibers 136, 138, and 140. Fiber 136 is connected to a light source 116 via simple connector 130, and to fiber 138 via coupling 142.

Fiber 138 is connected to fiber 140 via another coupling 142. All three fibers are therefore illuminated by a single light source, namely light source 116. The three fibers 136, 138, and 140 can be doped with dyes of various colors, achieving a multi-color effect with the single light source 116. If arranged in a specific sequence of lighter to deeper colors (e.g., yellow to orange to red), the light intensity of the various colors will appear fairly uniform along the entire joined length. This is a mixed illumination application, in that there is both side illumination and end illumination. The end illumination is generally not wasted, but used to pump the next fluorescent fiber.

The light source 116 is preferably of high power. To reduce the thermal stress that can be generated on highly saturated fluorescent fibers from high power illuminators, a clear optical conduit can be used to provide a buffer. Accordingly, fiber 136 can be instead a clear, non fluorescing fiber.

Figure 16:
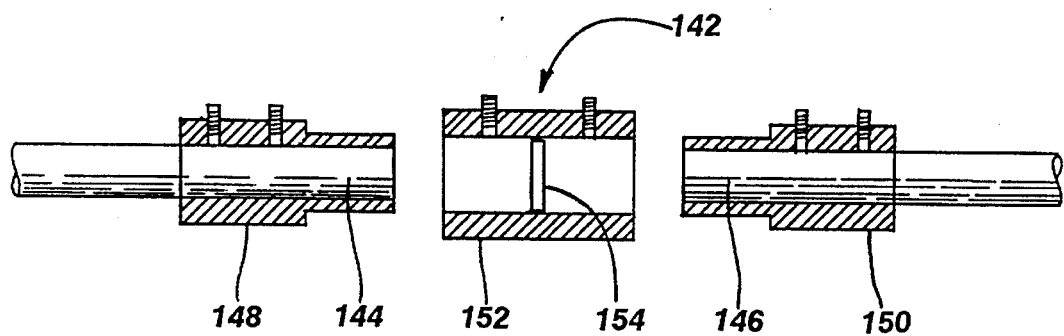
FIG. 16 illustrates a detail of an optical coupling used to connect two fluorescent optical fibers serially.

FIG. 16 illustrates a detail of an optical coupling 142 of FIG. 15. Optical couplings 142 are used to connect the ends of two fluorescent optical fibers 144, 146 serially. The coupling 142 comprises two metal male pins 148, 150, attached with set screws to the end of the fibers 144, 146, respectively, that are to be joined. The coupling 142 further comprises a female junction 152, adapted to receive the two male pins 148, 150. The female junction 152 further has set screws for securing the male pins 148, 150 in place.

The optical connection of the fibers 144, 146 can be temporary, or can be made permanent by using optical polymer adhesive. To provide additional versatility, a filter 154 (gel, dichroic, glass) can be added at the center of the female junction 152.

End Illumination Applications for Fluorescent Fibers

For end illumination applications, the fiber simply carries the light to its destination. The light emerges from the end of the fiber, and illuminates a field that is intended for viewing. Such a field may be a display (e.g. an instrument display), or an output lens (e.g. of a traffic light), etc.

The fluorescent optical fiber of the present invention is ideally suited for end illumination applications. The fiber of the present invention is particularly well suited for this application because it can generate a monochromatic light output with various saturation levels based upon the concentration of the dye used or the length of the fiber. Also, various colors may be used simultaneously to illuminate different areas of the same instrument or area, and still be pumped by a single light source.

Some illumination applications call for a plurality of fibers to be illuminated simultaneously by a single source. Such a connection will be described in reference with FIG. 17.

Figure 17:
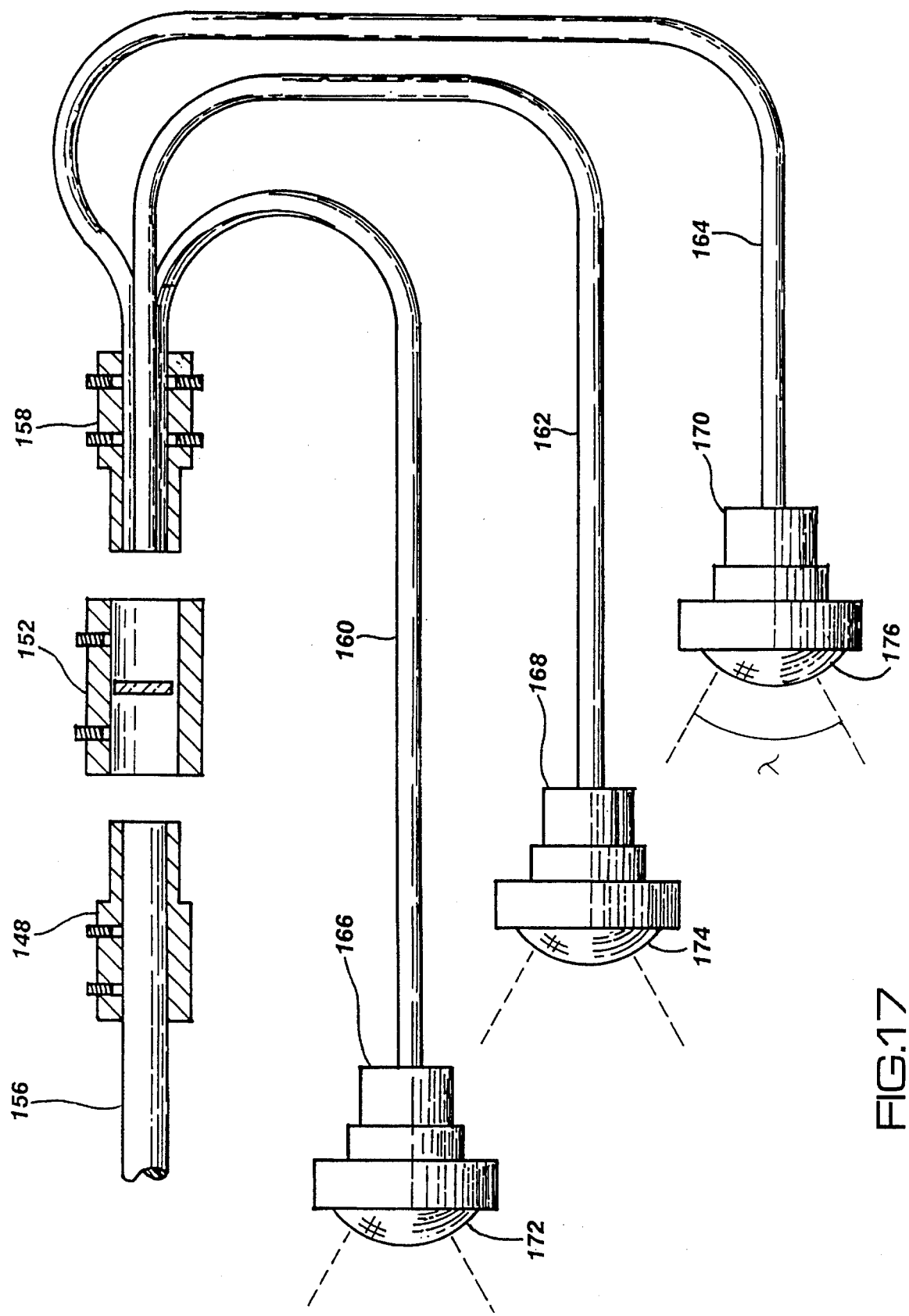
FIG. 17 illustrates three fluorescent optical fibers of the present invention that are connected in parallel and illuminated by a single light source.

In FIG. 17, a (preferably clear) fiber 156 carries illumination from a light source (not shown). The end of the fiber 156 is connected to a male pin 148, which in turn is connected to a female junction 152, which in turn is connected to a metal male pin 158. The male pin 158 is large enough to receive three illumination fibers 160, 162, 164 that are connected in parallel as shown. Alternately, the male pin 158 can be identical in size to male pin 148 and each of the fibers 160, 162, 164 is smaller in diameter than the fiber 156. Each one of fibers 160, 162, 164 terminates in a coupler 166, 168, 170 respectively, and each one of couplers 166, 168, 170 is attached to a lens 172, 174, 176 respectively.

Given the above described optical connections, the three fibers 160, 162, 164 are end pumped by the single light source, and colored light emerges from the lenses 172, 174, 176. The lenses 172, 174, 176 can be clear, and the emerging light is colored by the fluorescence of the three fibers 160, 162, 164. The emerging lights, for example, could be colored red, yellow and green. This way, different colors are produced as end illumination by a single light source. For illumination applications where the desired light output is from the end of the fluorescent fiber, a masking sheath can be added to the outside of the fiber to prevent light spill. This can be an opaque heat-shrinkable plastic tubing which would conform after shrinking to the outside of the FEP tubing jacket.

Different Geometries for Optical Pumping

Illumination applications can be further differentiated by the geometry of optical pumping into (a) end pumping applications and (b) side pumping applications.

Figure 18:
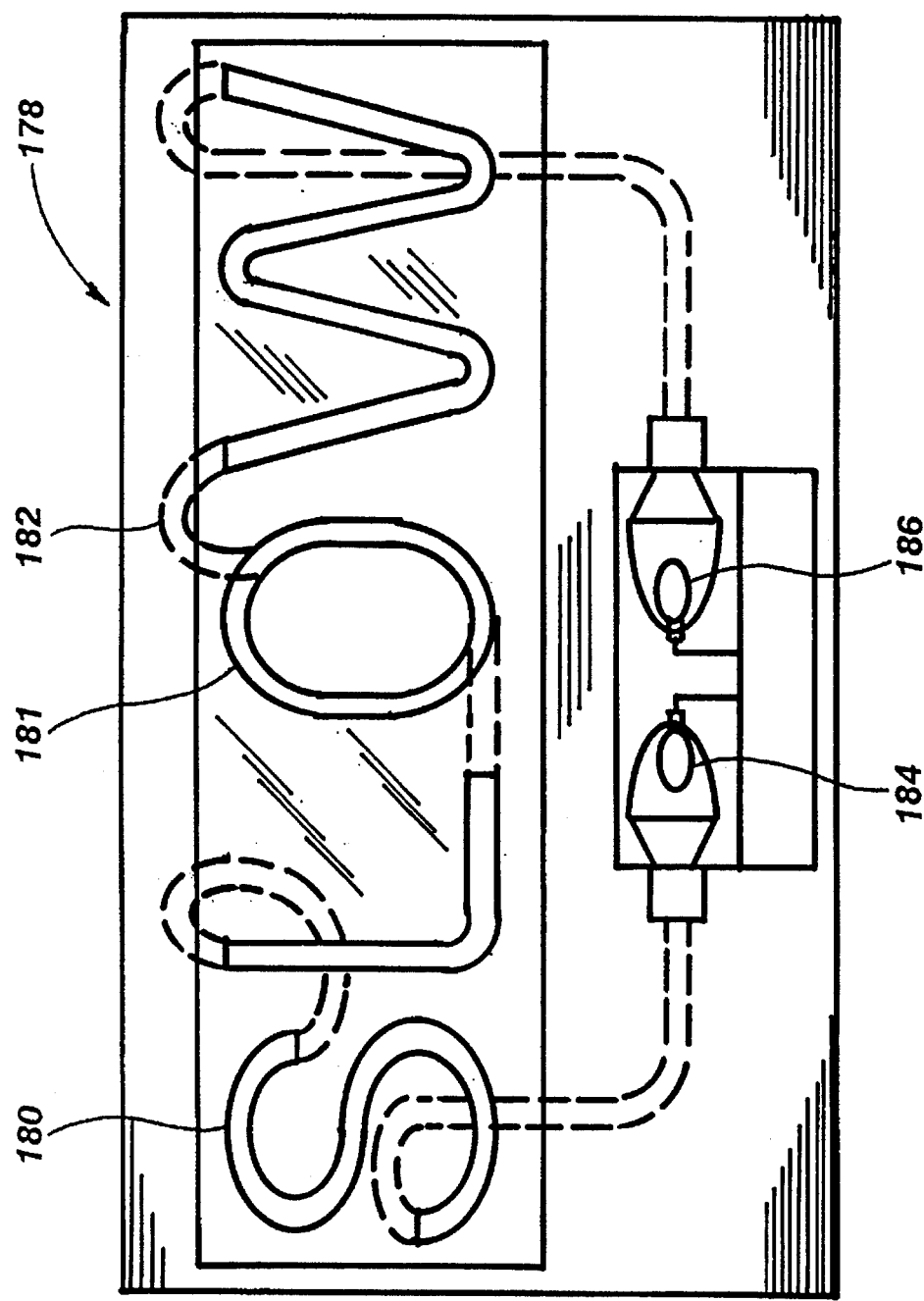
FIG. 18 illustrates a graphic sign application of the fluorescent optical fiber of the present invention.

A typical end pumping application is shown in FIG. 18. A graphic sign 178 is composed of a fluorescent fiber 180, that is intended for side illumination. The fiber 180 has exposed portions 181 and obscured portions 182. The fiber 180 has been bent so as to form the word "SLOW" with its exposed portions 181. The fiber is being end pumped by two light sources 184, 186 simultaneously from both ends for extra brightness.

Lasers are ideally suited for end pumping applications because lasers, by their nature, can produce have small diameter, coherent beams which can be easily aligned with the fiber input. Laser end pumping is especially useful when extremely bright fiber illumination is desired, or long lengths are to be lit, or when it is desired to overcome ambient light such as sunlight.

FIG. 19A illustrates a laser 188 arranged to end pump a fluorescent fiber 190. The fiber 190, when illuminated this way, exhibits a "super fluorescence" in terms of side light 192, which is many times brighter than neon. The color is highly saturated. This is a mixed illumination application, in that there is side light 192, and also end light 194. If no end light 194 is desired, the end of the fiber 190 can be capped by a retro-reflector such as retro-reflector 134 described in connection with FIG. 13, thereby further increasing the side light output.

Figure 19B:
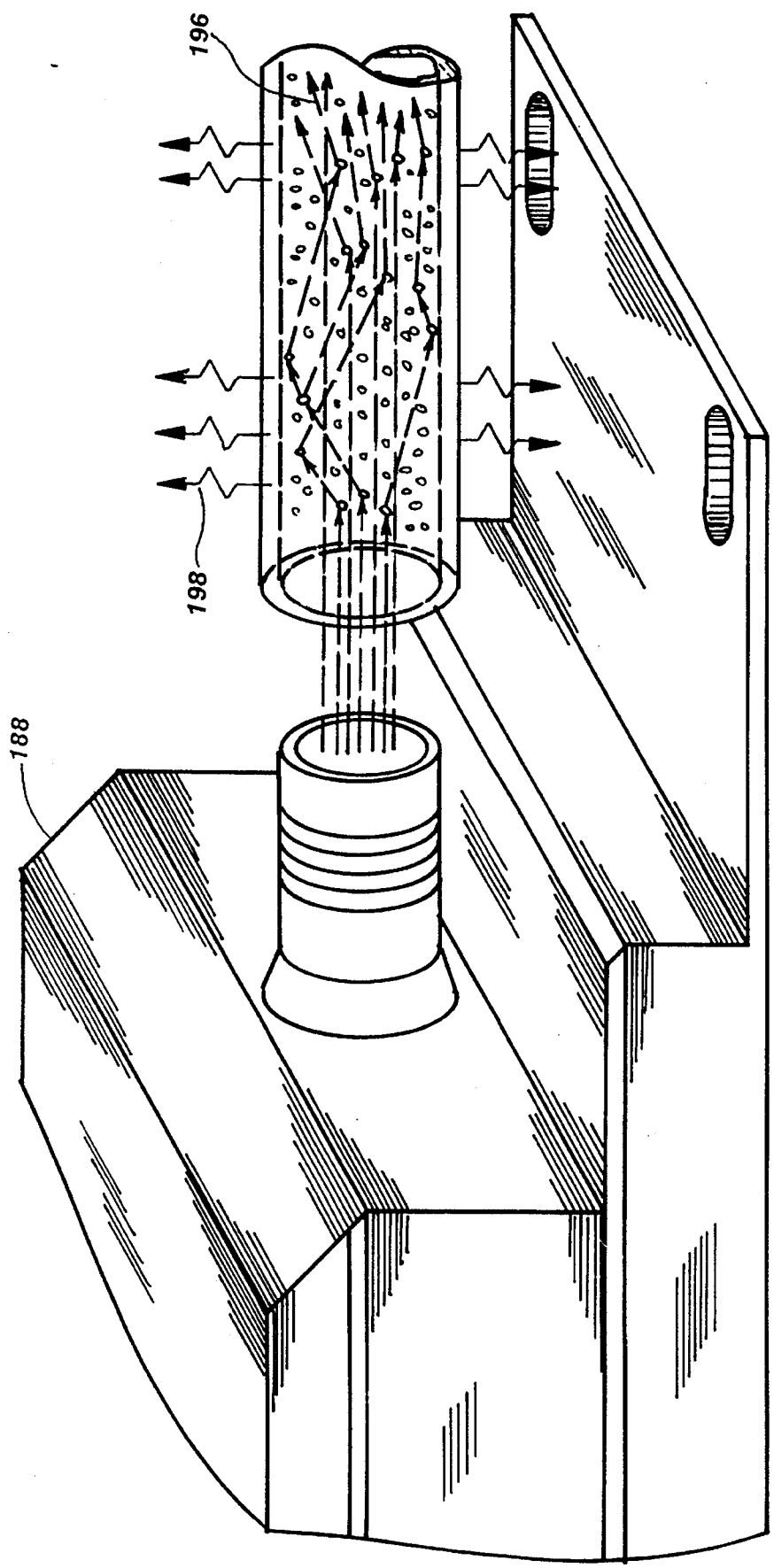
FIG. 19B illustrates a fluorescent optical fiber of the present invention containing light scattering material and is being optically end pumped by a laser.

FIG. 19B illustrates a laser 188 end pumping a fluorescent fiber 196, which has had scattering nanoparticles added to it. The result is a "superradiant" emission of intense side light 198. Since nanoparticles reflect and continuously diffuse the laser beam over the length of the fiber, the light output, which otherwise would have escaped through the end of the fiber is instead redirected as side light. This application is preferably used when maximum brightness is desired for shorter fiber lengths.

Unlike clear fiber, the fluorescent optical fiber of the present invention has the significant advantage that it can be also side pumped, by any one of the above mentioned light sources.

Side pumping arrangements are envisioned for side illumination applications. Accordingly, in such applications, it would be preferred to have retro-reflectors at both ends of each fiber segment, to prevent any light from escaping from the ends, where it will not contribute to side illumination, as will be shown by example below. Further, and as was explained above, for side pumping applications the jacket is typically removed from the fluorescent fibers during manufacturing, for maximum absorption of the pumping beam. The lack of cladding will not diminish the wave guiding ability of the optical fiber, as the entire length of the fiber is optically pumped.

Figure 20A:
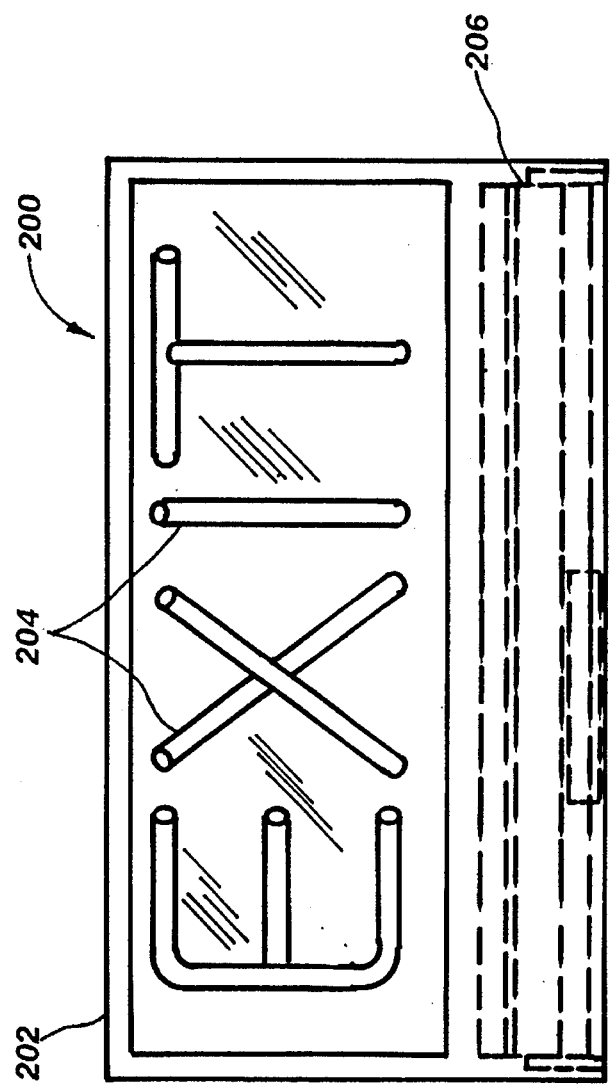
FIG. 20A illustrates a graphic sign application of the fluorescent optical fiber of the present invention.

A typical side pumping application is shown in FIG. 20A. A graphic sign 200 has a fixture 202, which contains fluorescent fiber segments 204, that are intended for side pumping and side illumination. The fiber segments 204 are entirely exposed, and are arranged within the fixture 202 to form the word "EXIT". The fiber segments 204 are being side pumped by a fluorescent tube 206 with a filter (commonly known as blacklight), which has been installed within the overall fixture 202 of the sign 200.

Figure 20B:
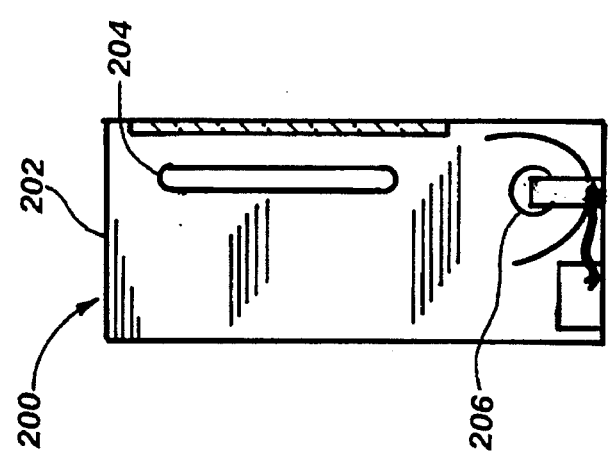
FIG. 20B illustrates a side view of the application of FIG. 20A.

FIG. 20B illustrates a side view of the graphic sign of FIG. 20A.

The real advantage of side pumping is most evident when the light source is located remotely from the graphic sign.

Figure 21A:
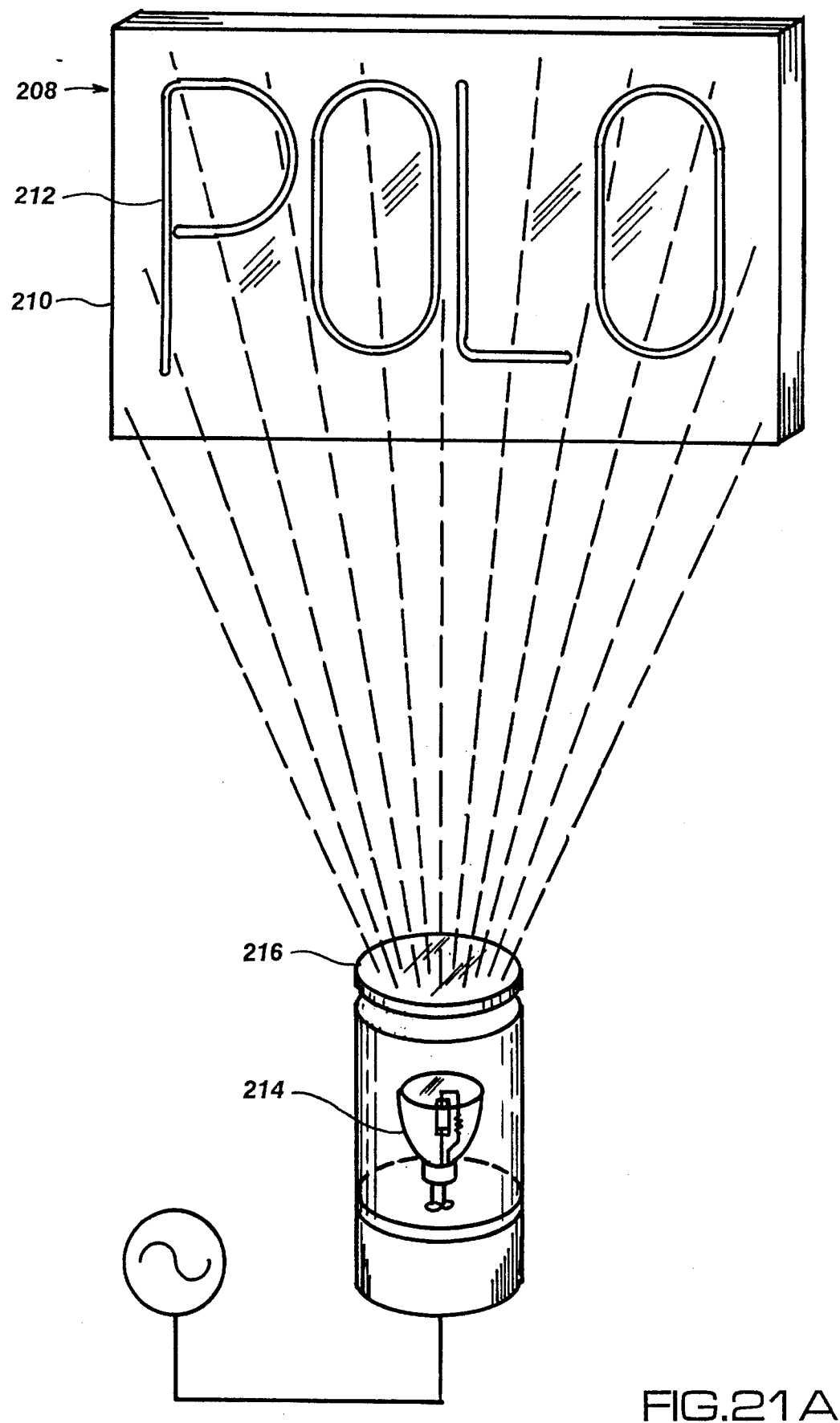
FIG. 21A illustrates a graphic sign application of side pumping according to the present invention.
Figure 21B:
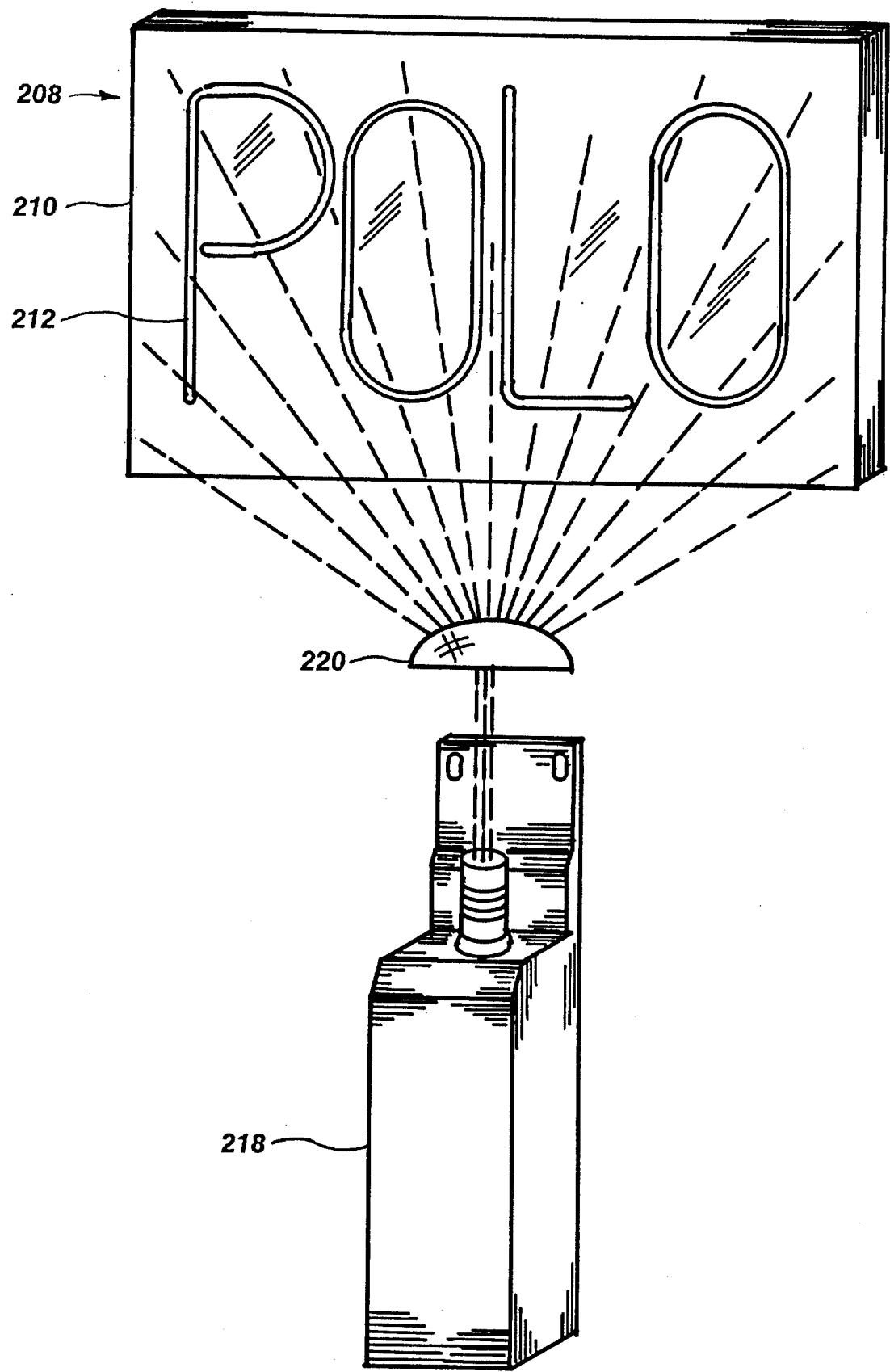
FIG. 21B illustrates the graphic sign application of FIG. 21A, being optically pumped by a laser.

A side pumping application with a remote light source is shown in FIGS. 21A and 21B. A graphic sign 208 is on a display panel 210, and contains fluorescent fiber segments 212 that are intended for side pumping and side illumination. The fiber segments 212 are entirely exposed, and are arranged within the display panel 210 to form the word "POLO". In FIG. 21A, the fiber segments 212 are being side pumped by a remotely located metal halide/mercury self-ballasted discharge bulb 214, in conjunction with a 365 nm bandpass filter 216. (The configuration can be optimized if the lamp has a built-in reflector that projects a beam at relatively long distances.) In FIG. 21B, the fiber segments 212 are being side pumped by a remotely located laser 218, whose beam passes through a diffusing lens 220.

Figure 21C:
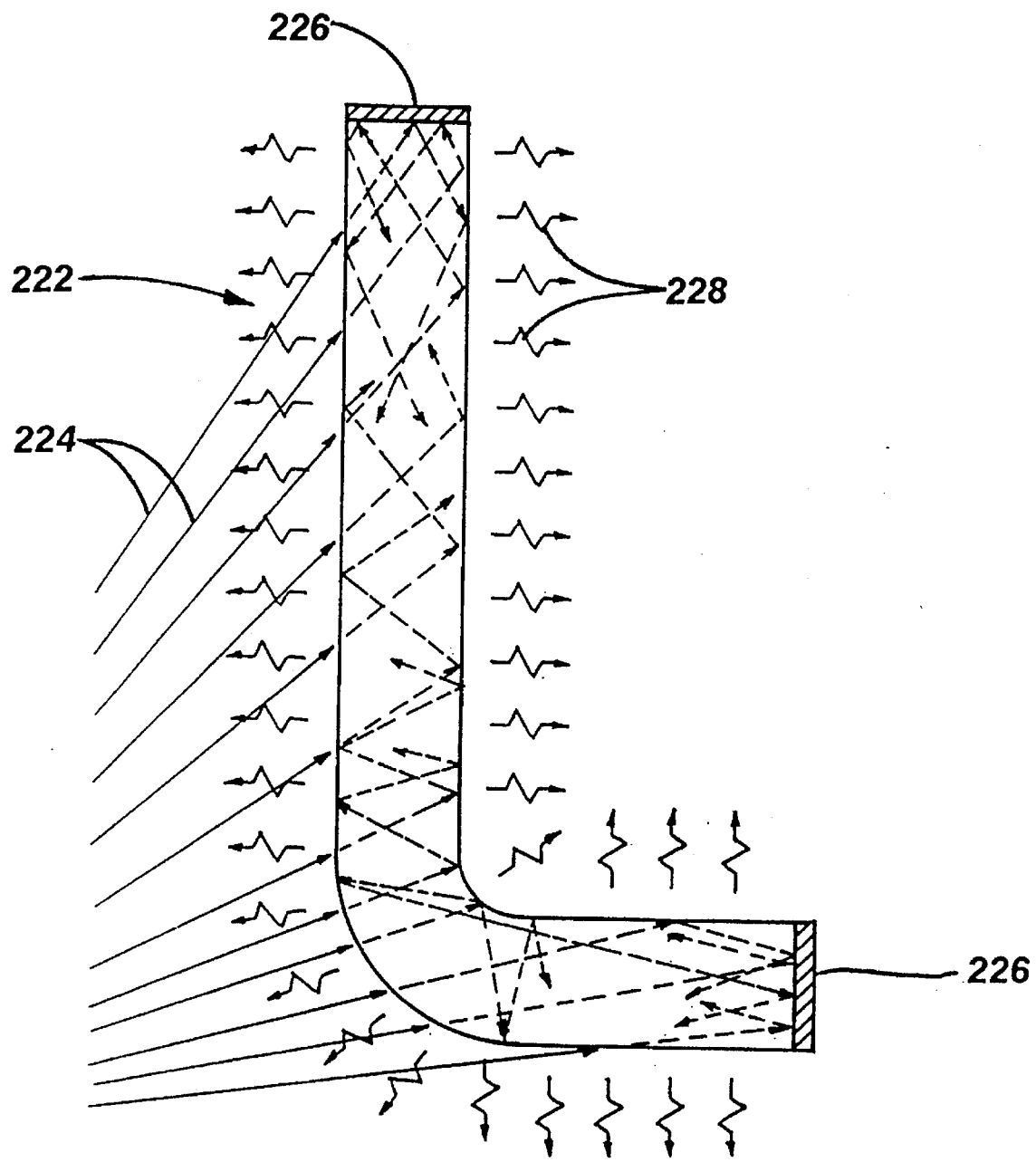
FIG. 21C illustrates a fiber segment bent to form the letter "L" and having retro-reflectors at both ends, for a side pumping side illumination application.

FIG. 21C illustrates a fluorescent fiber segment 222 of a graphic sign with retro-reflectors 226 fitted to each end. Each retro-reflector 226 is fitted on an end of the fiber so as to cause any core light incident upon the end of the fiber to be retro-reflected in the core. The incoming light rays 224 enter the fluorescent core of the fiber segment and are internally reflected many times. As the light traverses the core, it generates fluorescent light output 228.

In the above description numerous details have been set forth in order to provide a more thorough understanding of the present invention. It will be obvious, however, to one skilled in the art that the present invention may be practiced without these specific details. In other instances, well known features have not been described in detail in order to not obscure unnecessarily the present invention.

What is claimed is:

1. A fluorescent fiber for illumination comprising at least a core, the core being constructed by polymerization of a final mixture, the final mixture being constructed by adding a laser dye and a free radical initiator to an initial mixture, the initial mixture comprising a monomer and a cross-linking agent to cross-link the monomer, the monomer comprising between 35% and 70% by volume of the initial mixture.

2. The fluorescent fiber of claim 1 further comprising a cladding layer contacting and surrounding the core, the cladding layer being made of Teflon®.

3. A fluorescent fiber for fitting over a cylindrically shaped source of blacklight, comprising:
   a cylindrically shaped inner cladding layer of Teflon®;
   a cylindrically shaped outer cladding layer of Teflon® arranged concentrically with the inner cladding layer and leaving a cylindrical space therebetween; and
   a fluorescent material occupying the cylindrical space, operating as a core, the fluorescent material being constructed by polymerization of a final mixture, the final mixture being constructed by adding a laser dye and a free radical initiator to an initial mixture, the initial mixture comprising a monomer and a cross-linking agent to cross-link the monomer, the monomer comprising between 35% and 70% by volume of the initial mixture.

4. The fluorescent fiber of claims 1, 2 or 3, wherein the monomer is methyl methacrylate.

5. The fluorescent fiber of claims 1, 2 or 3, wherein the cross-linking agent is allyl diglycol carbonate.

6. The fluorescent fiber of claims 1, 2 or 3, wherein the free radical initiator is 2.2'-Azo-bis 2-methylpropinonitrile.

7. The fluorescent fiber of claims 1, 2 or 3, wherein the laser dye belongs in one of the Cyanine, Pyrromethene, Xanthene, Coumarin, Oxazole and Conjugated Hydrocarbons families of laser dyes.

8. The fluorescent fiber of claims 1, 2 or 3, wherein the final mixture further contains a scattering agent.

9. The fluorescent fiber of claim 8, wherein the scattering agent is one of barium sulfate particles and titanium dioxide particles.

10. The fluorescent fiber of claims 1, 2 or 3 further comprising a retro-reflector implemented at a first end of the core in such a way as to cause retro-reflection back into the core of any core light incident upon the first end of the core.

11. The fluorescent fiber of claim 10 further comprising another retro-reflector implemented at a second end of the core distinct from the first end of the core in such a way as to cause retro-reflection back into the core of any core light incident upon the second end of the core.

12. A fluorescent material being constructed by polymerization of a final mixture, the final mixture being constructed by adding a laser dye and a free radical initiator to an initial mixture, the initial mixture comprising a monomer and a cross-linking agent to cross-link the monomer, the monomer comprising between 35% and 70% by volume of the initial mixture.

13. The fluorescent material of claim 12, wherein the monomer is methyl methacrylate.

14. The fluorescent material of claim 12, wherein the cross-linking agent is allyl diglycol carbonate.

15. The fluorescent material of claim 12, wherein the free radical initiator is 2.2'-Azo-bis 2-methylpropinonitrile.

16. The fluorescent material of claim 12, wherein the laser dye belongs in one of the Cyanine, Pyrromethene, Xanthene, Coumarin, Oxazole and Conjugated Hydrocarbons families of laser dyes.

17. The fluorescent material of claim 12, wherein the final mixture further contains a scattering agent.

18. The fluorescent material of claim 17, wherein the scattering agent is one of barium sulfate particles and titanium dioxide particles.

19. A process for making a fluorescent material comprising the steps of:
   constructing an initial mixture comprising a monomer and a cross-linking agent to cross-link the monomer, the monomer comprising between 35% and 70% by volume;
   constructing a final mixture by adding a laser dye to the initial mixture and by adding a free radical initiator to the initial mixture to initiate a polymerization reaction; and
   heating the final mixture.

20. The process of claim 19, wherein the monomer is methyl methacrylate.

21. The process of claim 19, wherein the cross-linking agent is allyl diglycol carbonate.

22. The process of claim 19, wherein the free radical initiator is 2,2'-Azo-bis 2-methylpropinonitrile.

23. The process of claim 19, wherein the laser dye belongs in one of the Cyanine, Pyrromethene, Xanthene, Coumarin, Oxazole and Conjugated Hydrocarbons families of laser dyes.

24. The process of claim 19, further comprising the step of adding a scattering agent to the initial mixture.

25. The process of claim 24, wherein the scattering agent is one of barium sulfate particles and titanium dioxide particles.

* * * * *